United States Patent
Encrenaz et al.

(10) Patent No.: US 7,903,281 B2
(45) Date of Patent: Mar. 8, 2011

(54) METHODS, APPARATUS AND SOFTWARE FOR PRINTING LOCATION PATTERN AND PRINTED MATERIALS

(75) Inventors: Michel Georges Encrenaz, Rubi (ES); Johan Lammens, Sant Cugat Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1067 days.

(21) Appl. No.: 10/571,014

(22) PCT Filed: Aug. 27, 2004

(86) PCT No.: PCT/EP2004/051935
§ 371 (c)(1),
(2), (4) Date: Feb. 5, 2007

(87) PCT Pub. No.: WO2005/025201
PCT Pub. Date: Mar. 17, 2005

(65) Prior Publication Data
US 2007/0273917 A1    Nov. 29, 2007

(30) Foreign Application Priority Data
Sep. 10, 2003 (GB) .................... 0321164.6

(51) Int. Cl.
*H04M 1/40* (2006.01)
(52) U.S. Cl. ............... 358/1.9; 358/1.15; 358/468
(58) Field of Classification Search ............. 358/1.9, 358/1.15, 2.1, 468; 345/596; 364/470; 395/109; 235/454; 347/19, 43, 3; 382/303
See application file for complete search history.

(56) References Cited

U.S. PATENT DOCUMENTS

| | | | |
|---|---|---|---|
| 5,140,686 A * | 8/1992 | Cox et al. ................. | 365/201 |
| 5,615,312 A | 3/1997 | Kohler et al. | |
| 5,642,444 A * | 6/1997 | Mostafavi ................. | 382/303 |
| 5,949,964 A * | 9/1999 | Clouthier et al. ............ | 358/3.06 |
| 6,132,024 A * | 10/2000 | Nelson et al. ................ | 347/19 |
| 6,429,948 B1 * | 8/2002 | Rumph et al. ............ | 358/1.15 |
| 6,441,913 B1 | 8/2002 | Anabuki et al. | |
| 6,644,764 B2 * | 11/2003 | Stephens, Jr. ................ | 347/3 |
| 7,328,845 B2 * | 2/2008 | Tsai ........................ | 235/454 |
| 2002/0036645 A1 * | 3/2002 | Funahashi ................. | 345/596 |
| 2002/0091711 A1 | 7/2002 | Ericson | |
| 2002/0166895 A1 | 11/2002 | Wiebe et al. | |
| 2003/0133164 A1 | 7/2003 | Tsai | |
| 2003/0151756 A1 | 8/2003 | Yamazaki et al. | |

FOREIGN PATENT DOCUMENTS

| | | |
|---|---|---|
| EP | 0 622 952 A | 11/1994 |
| WO | WO 01/26032 A | 4/2001 |
| WO | WO 01/89850 A | 11/2001 |
| WO | WO 02/42955 A | 5/2002 |
| WO | WO 02/082366 A1 | 10/2002 |
| WO | WO 03/018316 A | 3/2003 |

* cited by examiner

*Primary Examiner* — Thomas D Lee
*Assistant Examiner* — Stephen M Brinich

(57) ABSTRACT

A print control system adapted to control a digital printer having a first machine-readable ink of a first colour and a second ink that is not machine readable at the same wavelength as said first ink and that is of substantially the same colour, said system being adapted to control said printer to print upon a document in said first ink a position—determining pattern readable by a digital pen to enable said pen to acquire data to enable a position of said pen in said pattern to be determined, and to print human discernable content that is not read by said pen superposed with said pattern using said second ink and not said first ink.

10 Claims, 26 Drawing Sheets

| Desired Colour | Proportion of individual ink colours required to create desired colour | | | | | |
| --- | --- | --- | --- | --- | --- | --- |
| RGB | C | Y | M | K | Lc | Lm |
| 1 | $A_1$ | $B_1$ | $C_1$ | $D_1$ | $E_1$ | $F_1$ |
| 2 | $A_2$ | $B_2$ | $C_2$ | $D_2$ | $E_2$ | $F_2$ |
| 3 | $A_3$ | $B_3$ | $C_3$ | $D_3$ | $E_3$ | $F_3$ |
| . | . | . | . | . | . | . |
| . | . | . | . | . | . | . |
| . | . | . | . | . | . | . |
| 255 | $A_{255}$ | $B_{255}$ | $C_{255}$ | $D_{255}$ | $E_{255}$ | $F_{255}$ |
| 256 | $A_{256}$ | $B_{256}$ | $C_{256}$ | $D_{256}$ | $E_{256}$ | $F_{256}$ |

Fig 11A

| Desired Colour | Proportion of individual ink colours required to create desired colour | | | | |
| --- | --- | --- | --- | --- | --- |
| RGB | C | Y | M | K1 | K2 |
| 1 | $G_1$ | $H_1$ | $I_1$ | $J_1$ | $K_1$ |
| 2 | $G_2$ | $H_2$ | $I_2$ | $J_2$ | $K_2$ |
| 3 | $G_3$ | $H_3$ | $I_3$ | $J_3$ | $K_3$ |
| . | . | . | . | . | . |
| . | . | . | . | . | . |
| . | . | . | . | . | . |
| 255 | $G_{255}$ | $H_{255}$ | $I_{255}$ | $J_{255}$ | $K_{255}$ |
| 256 | $G_{256}$ | $H_{256}$ | $I_{256}$ | $J_{256}$ | $K_{256}$ |

Fig 11B

METHODS, APPARATUS AND SOFTWARE FOR PRINTING LOCATION PATTERN AND PRINTED MATERIALS

FIELD OF THE INVENTION

This invention relates to methods, apparatus and software relating to the printing of location pattern, typically printed on a document, and to printed materials. Some embodiments relate to documents printed with a location pattern, to printers, ink cartridges for printers, to ink sets, and to printer control software and systems, and to printed sheets (e.g. paper).

BACKGROUND OF THE INVENTION

The invention arose out of a consideration of the work of Anoto Group AB and others in relation to digital pattern paper and digital pens. It is convenient to discuss the invention in that contextual background, but it will be appreciated that the invention is not restricted to use with any proprietary system.

The prior art Anoto digital pen and paper system is described on their website www.anotofunctionality.com. However, since the content of websites can change with time it is to be made clear that the prior art admitted is that which was published on their website no later than the day before the priority date of this patent application. It is also appropriate to include in this application itself a brief review of the Anoto system.

PRIOR ART

FIG. 1 shows schematically an A4 sheet 10 of Anoto digital paper. This comprises a part of a very large non-repeating pattern 12 of dots 14. The overall pattern is large enough to cover 60,000,000 square kilometres. The pattern 12 is made from the dots which are printed using infra-red absorbing black ink. The dots 14 are spaced by a nominal spacing of 300 µm, but are offset from their nominal position a little way (about 50 µm), for example north, south, east or west, from the nominal position.

In WO 01/126032, a 4×4 array of dots is described, and also a 6×6 array of dots, to define a cell. Each cell has its dots at a unique combination of positions in the pattern space so as to locate the cell in the pattern space. The dot pattern of an area of the dot pattern space codes for the position of that area in the overall dot pattern space. The contents of WO 01/126032 are hereby incorporated by reference, with especial reference on the dot pattern and the pen.

The sheet 12 has a pale grey appearance due to the dots 14.

FIG. 2 schematically shows a digital pen 20 adapted to write human readable ink in non-machine-readable IR transparent ink and to read a position dot pattern in infra-red. The pen 20 has a housing 22, a processor 24 with access to memory 26, a removable and replaceable ink nib and cartridge unit 28, a pressure sensor 29 adapted to be able to identify when the nib is pressed against a document, an infra-red LED emitter 30 adapted to emit infra-red light, an infra-red sensitive camera 32 (e.g. a CCD or CMOS sensor), a wireless telecommunications transceiver 34, and a removable and replaceable battery 36. The pen 20 also has a visible wavelength warning light 38 (e.g. a red light) positioned so that a user of the pen can see it when they are using the pen, and a vibration unit 40 adapted to vibrate and to cause a user to be able to feel vibrations through the pen.

Such a pen exists today and is available from Anoto as the Logitech IO™ pen.

The pen, when in use writing on a page/marking a page, sees a 6×6 array of dots 14 and its processor 24 establishes its position in the dot pattern from that image. In use the LED 30 emits infra-red light which is reflected by the page 12 and detected by the camera 32. The dots 14 absorb the infra-red and so are detectable against the generally reflective background. Of course, the ink of the dots might be especially reflective in order to distinguish them (and the paper less reflective), or they may fluoresce at a different wavelength from the radiation that excites them, the fluorescent wavelength being detected. The dots 14 are detectable against the background page.

The processor 24 processes data acquired by the camera 32 and the transceiver 34 communicates processed information from the processor 24 to a remote complementary transceiver (e.g. to a receiver linked to a PC). Typically that information will include information related to where in the dot pattern the pen is, or has been, and its pattern of movement.

There are times when the processor 24 cannot determine its position in pattern space (the overall virtual space defined by the very large dot pattern). For example, if the pen is moved too fast over the pattern the processor cannot process the images fast enough. Also the pen may not be able to see where it is in the dot pattern. This can happen if the page 14 is marked or defaced by colorants, or the pattern covered up with something, or the field of view of the pattern is obscured. The user putting their finger in the way is a common reason why the processor fails to recognise the position of the pen. In order to alert the user to the fact that the pen is not able to determine its position properly the processor 24 is adapted to illuminate the light 38 and cause the vibrator 40 to vibrate. The user gets visual and tactile feedback that the camera is not seeing the dot pattern properly/that the pen is unable to determine its position properly.

Anoto intend that their digital paper, offset-printed with dot pattern, either over the whole of its surface or over selected regions, be available from specially registered printing companies who know the technologies necessary to achieve good results. End users must buy their paper pre-printed with machine-readable position dot pattern and pre-printed with human readable content (e.g. text, or pictures, or lines, or boxes or frames etc). This is to avoid problems. One problem avoided by such a system is that of users who design their own forms or documents printing human discernable or readable content over the dot pattern with the wrong ink (ink that is IR-absorbing ink), thereby masking the dot pattern from the digital pen, when the pen is used.

FIGS. 3 and 4 illustrate other Anoto solutions to the problem of content interfering with the pens ability to read the pattern. In FIG. 3 the dot pattern is referenced 44 and human discernable check boxes 46 are disposed next to legends 48. The check boxes are printed with blue ink that is substantially invisible in the infra-red wavelength of interest, and so does not obscure the dots from the camera of the pen. The legends 48 can be in infra-red absorbing black ink because there is no dot pattern near them anyway.

In FIG. 4 the boundary of the dot pattern is shown as dashed outline 50, but the actual dot pattern is not shown for clarity. A legend 52, is outside of the region that will be seen by the pen. This time the area for writing is kept clear of obstructions, and again the content, in the form of lines, referenced 54, indicating to the user where to write, are printed in non-infra-red absorbing ink.

A prior art Anoto website indicated in July 2003 in the section "printing" for the specialist print shops that:

"The pattern must be printed with ink that gives a high contrast for the pen camera, that is, the ink must have high absorption at the wavelength band 800-950 nm. We recommend that you use process black to print the pattern. Print on top of the pattern, on the other hand, must be printed with ink that is transparent to the pen, that is, the ink must have very low absorption of light of these wavelengths.

Anoto Substitute Black

Anoto substitute back is black ink that is not seen by the pen. Therefore, Anoto substitute black can be used on top of the pattern without disturbing the functionality. If you wish to print anything in a four-colour process on top of the pattern, then the K-channel in CMYK must be printed with Anoto substitute black. Anoto substitute black has very low absorption at wavelengths between 800 nm and 950 nm.

The ink is provided by SunChemical. If you contact your closest SunChemical they shall be able to help you. If you have any problem please tell them to contact SunChemical in Sweden."

SUMMARY OF THE INVENTION

According to a first aspect of the invention, there is provided a print control system adapted to control a digital printer having a first machine-readable ink of a first colour and a second ink that is not machine readable at the same wavelength as said first ink and that is of substantially the same colour, said system being adapted to control said printer to print upon a document in said first ink a position-determining pattern readable by a digital pen to enable said pen to acquire data to enable a position of said pen in said pattern to be determined, and to print human discernable content that is not read by said pen superposed with said pattern using said second ink and not said first ink.

According to another aspect of the invention, there is provided a print control system adapted to control a digital printer having a first machine-readable ink and a second ink, or inks, that is/are not machine-readable at the same wavelength as said first ink, said system being configured to cause said printer to print documents having both:—
  (i) machine-readable pattern adapted to enable a digital pen to acquire data to enable its position in said pattern to be determined, and
  (ii) human-discernable content that is not read by said pen in use, said system being configured to cause said printer to print said pattern with said first ink, and to print said document with content which is superposed with pattern using said second ink or inks, and to print at least some content that is not superposed with said pattern using said first ink.

The print control system may be adapted to route data representative of content colour to (i) a colour separation process, and to (ii) a half-toning process, and to (iii) a masking process, and where said system is adapted to route data representation of pattern so as to by-pass a half-toning process. Alternatively, the print control system may be adapted to route data representative of pattern so as to by-pass a masking process.

The print control system may be adapted to route data representative of content through a linearisation process, and adapted to route data representation of pattern so as to by-pass said linearisation process.

According to another aspect of the invention, there is provided a print control system adapted to control a digital printer having a first machine-readable ink and a second ink, or inks, that is/are not machine-readable at the same wavelength as said first ink, said system being configured to cause said printer to print documents having both (i) machine-readable pattern adapted to enable a digital pen to acquire data to enable its position in said pattern to be determined, and (ii) human-discernable content that is not read by said pen in use, said system being adapted to route data representative of content colour to (i) a colour separation process, and to (ii) a half-toning process, and to (iii) a masking process, and where said system is adapted to route data representation of pattern so as to by-pass a half-toning process.

According to another aspect of the invention, there is provided a method of printing documents having printed thereupon both:
  (i) machine-readable position-determining pattern adapted to enable a machine reader to determine its position in a pattern space, and
  (ii) human-discernable content adapted not to be read by said machine reader;
the method comprising digitally printing the content and pattern onto the document using the same digital printer, the printer having a first ink which is not machine-readable at a particular wavelength of electromagnetic radiation and a second ink that is machine-readable at the said particular wavelength, and printing the content with the first ink and not the second ink, at least where said content overlies said pattern, and printing the pattern using the second ink; and wherein content is printed in ink of substantially the same colour as said pattern.

According to another aspect of the invention, there is provided a method of printing documents having printed thereupon both:
  (i) machine-readable position-determining pattern adapted to enable a machine reader to determine its position in a pattern space, and
  (ii) human-discernable content adapted not to be read by said machine reader;
the method comprising digitally printing the content and pattern onto the document using the same digital printer, the printer having a first ink which is not machine-readable at a particular wavelength of electromagnetic radiation and a second ink that is machine-readable at the said particular wavelength, and printing the content with the first ink and not the second ink, at least where said content overlies said pattern, and printing the pattern using the second ink; wherein data representative of content is half-toned, and wherein data representation of pattern bypasses a half-toning process.

According to another aspect of the invention, there is provided a method of printing documents having printed thereupon both:
  (i) machine-readable position-determining pattern adapted to enable a machine reader to determine its position in a pattern space, and
  (ii) human-discernable content adapted not to be read by said machine reader;
the method comprising digitally printing the content and pattern onto the document using the same digital printer, the printer having a first ink which is not machine-readable at a particular wavelength of electromagnetic radiation and a second ink that is machine-readable at the said particular wavelength, and printing the content with the first ink and not the second ink, at least where said content overlies said pattern, and printing the pattern using the second ink, wherein content that is not superposed with pattern is printed with said second ink.

According to another aspect of the invention, there is provided a method of printing documents having printed thereupon both:
  (i) machine-readable position-determining pattern adapted to enable a machine reader to determine its position in a pattern space, and (ii) human-discernable content adapted not to be read by said machine reader;

the method comprising digitally printing the content and pattern onto the document using the same digital printer, the printer having a first ink which is not machine-readable at a particular wavelength of electromagnetic radiation and a second ink that is machine-readable at the said particular wavelength, and printing the content with the first ink and not the second ink, at least where said content overlies said pattern, and printing the pattern using the second ink;

the method further comprising using a printing system that has a plurality of colour translation look-up tables to translate computer electronic colours to ink set colour values, one of said tables translating electronic colours to ink set colour values for content to be printed not using an ink set that has said second ink colour.

According to another aspect of the invention, there is provided a method of using a computer processor linked to a printer comprising:
 (i) at a first time using the computer processor to print documents, or parts of documents, that have both (a) machine-readable position-determining pattern and also (b) human discernable, but not machine-readable, content, by printing the pattern using an ink that is machine-readable at a specific wavelength and the content using an ink or inks that are not machine-readable at said specific wavelength, the printer having both inks; and
 (ii) at a second time using the computer processor to print documents, or part of documents, that have no pattern using said ink that is machine-readable as at least one of the ink(s) used to print the content.

According to another aspect of the invention, there is provided a printer having a black ink allocated to a colour channel, said black ink absorbing at an infra-red wavelength, and wherein the printer is controlled using the method of any statement of invention when printing a document having both machine-readable position-detecting pattern and non-machine-readable human-discernable content to print the pattern using the black ink and at least some content not using the black ink.

According to another aspect of the invention, there is provided a method of printing a printed article having both a human discernable content visible at a visible wavelength of light, and a machine-determinable position determining pattern detectable at a non-visible wavelength of light, the method comprising printing the pattern and the human discernable content in a single printing operation substantially simultaneously using a printer that has both a first ink that is absorptive at said non-visible wavelength, and that is used to print the pattern, and a second ink that is not substantially absorptive at said non-visible wavelength, but is visible at said visible light wavelength, and which second ink is used to print at least such said content as is superposed with pattern.

A method according to any preceding method statement of invention may comprise altering software on a printer driver, or installing new printer driver software, to print pattern exclusively from one colour channel, or a limited selected number of colour channels, of the printer, and to print content not using that channel (or channels), at least in areas where pattern is present.

A method according to any preceding method statement of invention may comprise changing at least one ink in a printer so that the inks in the printer include at least one ink that absorbs at a non-visible wavelength and at least one ink of the same colour that does not absorb significantly at said non-visible wavelength.

In a hexichrome printer adapted to print six colours, a method of printing according to any preceding method statement of invention may comprise having said first ink be of a first colour and be of a first kind in a first colour channel to print said machine-readable position-determining pattern, and using at least four other colour channels to print at least some of said human-discernable content in full colour using three complementary colour inks and a second ink also of said first colour, the inks used to print content that is superposed with pattern being of a second kind; ink of the first kind absorbing at an infra-red wavelength, and ink of said second kind not absorbing at said infra-red wavelength significantly.

According to another aspect of the invention, there is provided the use of an ink set comprising a first ink of a first colour which absorbs at a non-visible wavelength, and a second ink of said first colour which does not significantly absorb at said non-visible wavelength in printing both a machine-readable position-determining pattern and human-discernable content upon an article in a single printing operation using a single printer.

According to another aspect of the invention, there is provided a local area network comprising a plurality of computer terminals networked to at least one printer, the printer having a first ink channel that has ink of a first colour that does not absorb at a selected, preferably non-visible, wavelength and a second ink channel that has ink also of said first colour that absorbs at said selected wavelength, and wherein the computer terminals are adapted to send a request for a document to be printed to one or more printers on said network, and said printer(s) are adapted to receive that request and to print a document pursuant thereto; said computers being adapted to generate a request for said document to be printed including instructions adapted to cause said printer to print machine-readable position-determining pattern on said document using said second ink channel, and also including instructions adapted to cause human-discernable content to be printed on said document using said first ink channel, and said printer(s) being adapted to be responsive to receipt of such instructions to print a document having said pattern and said content, and wherein said computer terminals are also adapted to send instructions to the printer(s) which cause the printers to print human-discernable content on documents that have no pattern using ink from said second channel.

According to another aspect of the invention, there is provided a method of printing on demand a page or other article with both a machine-readable position-determining pattern readable at a specific, optionally non-visible, wavelength and also human-discernable content using a single digital printer responsive to a print command from a user's processor, the method comprising having content data and pattern data and processing the content data differently from the pattern data during data processing performed to print the document.

According to another aspect of the invention, there is provided a method of reducing problems experienced by an infra-red digital pen in determining a position in a dot pattern, the pen having an infra-red sensor and a camera adapted to recognise a position in a dot position-determining pattern printed in ink that is detectable on a page or sheet at an infra-red wavelength, the method comprising using a digital printer to print the page or sheet on demand from a user in a single print operation, the dot pattern printed with infra-red absorbing black ink, and human-discernable content, at least in the vicinity of said pattern, printed using black ink that is not infra-red absorbing significantly as observed by said pen.

According to another aspect of the invention, there is provided a computer programme product which, when used on a computer processor controlling a printing operation of a digital printer having a first electromagnetic wavelength absorbing ink and a second ink of the same colour as said first ink that does not absorb significantly at the first electromagnetic absorption wavelength of the first ink, causes a printer controlled by the processor to print a machine-readable pattern using the first ink and a human discernable content that is superposed with said pattern using the second ink and not the first ink.

According to another aspect of the invention, there is provided the use of a subset of inks of an ink set provided in a digital printer to print machine-readable position-determining pattern on a document, and the use of a different subset of inks of said ink set to print human-discernable content in said document, where said content is superposed with said pattern and the use of a third subset of inks of said ink set to produce content on documents which do not have pattern or on areas of said document which do not overlay pattern.

According to another aspect of the invention, there is provided a colour separation look-up table for use in a colour separation in digital printing, the look-up table having a concordance between a plurality of colours and for each colour an equivalent level of ink for each ink available in an ink set expected to be available to a printer, and wherein the look-up table has a first colour for which a specific ink colour channel is to be used exclusively, not using inks from other ink colour channels, and wherein the look-up table has for other colours, optionally all other colours, equivalent combinations of levels of ink from said other ink colour channels, no ink of said specific ink colour channel being associated with said other colours.

According to another aspect of the invention, there is provided a colour separation unit for a printer comprising two colour separation look-up tables: a first to be used when a document having machine-readable pattern is to be printed or for areas of a document which are superposed with pattern, and a second, different, look-up table to be used when a document having no pattern is printed, or for areas of a document that have no pattern.

According to another aspect of the invention, there is provided a method of using a printer to print a document having machine-readable pattern and human-discernable content comprising using a colour separation process to print pattern using an ink that is not used to print any of the content either (i) at all, or (ii) at least in the areas of the document where the content and pattern are superposed one on the other.

According to another aspect of the invention, there is provided a sheet of paper having content and position-determining pattern printed upon it, the pattern being printed in an ink which absorbs radiation at a particular wavelength and being of a particular colour, and content that is superposed with said pattern being printed with an ink that is of substantially said particular colour and which does not absorb at said particular wavelength.

According to another aspect of the invention, there is provided a sheet of paper having content and position-determining pattern printed upon it, the pattern being printed with ink that absorbs radiation at a particular wavelength, and pattern superposed with first said content being printed in an ink or inks which do not absorb at said wavelength, second said content being printed on said sheet in an area or areas that do not superpose pattern and being printed with an ink or inks which absorb at said wavelength.

According to another aspect of the invention, there is provided software adapted to choose a correct colour separation dataset from a plurality of colour separation datasets available for graphical objects which will be printed in areas that will also have content, said software selecting another dataset for graphical objects that will not be superposed with content.

According to another aspect of the invention, there is provided use of a printer having two black inks: a first that absorbs infra-red radiation and a second that does not, to print a position-determining pattern using the infra-red absorbing black ink and to print content superposed upon said pattern using said non-infra-red absorbing black ink.

According to another aspect of the invention, there is provided an ink cartridge or ink set for a digital printer, the ink set or cartridge having two black inks: a first black ink which absorbs infra-red radiation at a specific wavelength for printing a position-determining pattern, and a second black ink which does not significantly absorb at said wavelength for printing content superposed with said pattern.

According to another aspect the invention comprises a method of printing a printed article having both a human discernable content visible at a visible wavelength of light, and a machine-determinable position determining pattern detectable at a non-visible wavelength of light, the method comprising printing the pattern and the human discernable content in a single printing operation substantially simultaneously using a printer that has both a first ink that is absorptive at said non-visible wavelength, and that is used to print the pattern, and a second ink that is not substantially absorptive at said non-visible wavelength, but is visible at said visible light wavelength, and which second ink is used to print the content.

Previously, the prior art has printed the pattern in a separate operation from printing the content, using different printers (e.g. an offset printer).

A difficulty is that having a document offset printed by someone else in advance of a need for that document introduces a delay in being able to obtain the document, and requires foresight and planning. It is not as flexible as printing documents off a commercial domestic or business printer, such as a 600 dpi or 1200 dpi inkjet or laser printer (or using a LEP printer, or printing them using toner/photocopier technology).

Anoto say to print on top of the pattern, in a second printing run/pass, using non-infra-red absorbing ink, for example by putting their special Anoto substitute black ink in the K channel of a four-colour CMYK printer, at the specialist printer's facility. We have realised that it is better to move away from that and in some embodiments bring the ability to print suitable forms/documents closer to the end user, using currently available hardware. We have realised that it is possible to give greater immediacy and local support to a user, in some embodiments without changing the physical existing digital printers.

The human discernable content may be printed in monochrome (e.g. black). The printer may have a second ink comprising an ink that is black in visible wavelengths. The printer may have a plurality of second inks of different colours, and the content may be printed using a plurality of colours. There may be three or more different coloured second inks adapted to be used to produce the effect of substantially a full range of colours and the printing of the content may be in full colour. The plurality of second inks may comprise cyan, magenta and yellow.

There may be only three, or less, second inks of different colours, for example cyan, magenta and yellow. Content printed in black may be produced by using/mixing the second inks. The second inks do not have to include cyan, magenta and yellow. For example, less than full colour printers may be provided, or an ink set which does allow a wide range of colours, or even full colour content printing, may be provided comprising other complementary colours.

The second inks may include cyan, magenta, yellow and black.

The first ink may be of any colour, or may be invisible or of low visibility in visible wavelengths of light. The first ink may be a black ink. Thus we may provide two different black inks and three complementary colour inks (at least).

The second ink or inks may be dyes, and may not be pigment-based. The first ink may be a pigment-based ink, for example an ink including carbon black as a pigment.

There may be more than one first ink in the printer used to print the printed article. There may be two or more first inks absorbing at different non-visible wavelengths, or they may absorb at the same non-visible wavelength. They may have the same or different colours at visible wavelengths.

The non-visible wavelength may comprise an infra-red wavelength.

Although the first ink has been said to be non-reflective/absorptive at a non-visible wavelength, for printing onto a printed article (such as paper) that is reflective at the non-visible wavelength, it will be appreciated that the first and second inks could have significantly different refelective/absorbtive characteristics at said non-visible wavelength, with the first ink being reflective and the second ink(s) being absorptive.

The first ink may emit electromagnetic radiation at a different frequency from that of electromagnetic radiation it absorbs, for example it may fluoresce. The second ink(s) and the article should not emit radiation at that wavelength of emission for the first ink.

Protection is sought for methods of printing on an article using first and second inks of the same, or substantially the same, colour such that the first ink used to print the position-detecting pattern has differentiable electromagnetic radiation spectral characteristics at a non-visible wavelength when illuminated with electromagnetic radiation from those of a surface of the article upon which the printing is applied, compared to the characteristics of the second ink(s).

Preferably the printer comprises a digital printer, possibly from the group: inkjet printer, laser printer, LED printer, LCD printer, gel printer (e.g. Indigo printer).

Digital printers are preferred because of their immediacy of use for a user, because of their flexibility, and because many digital printers already have the capacity of accepting two or more different types of inks and of using those inks substantially simultaneously.

The printer may print the pattern and content together, line by line as it prints print lines on a page (or other article). Alternatively, the printer may print content at a different time from pattern: either before or after. However, in many aspects of the invention (but not all), it is preferred that if the content and pattern are printed at different times they are still printed substantially simultaneously in a single printing operation in the sense that the article is not bodily removed from one printer that has printed content or pattern and transferred to another printer to print the other of content or pattern, and in that there is no significant delay to the user. For example, a printer could pass an article (e.g. page of paper) past a print head or station to print pattern and moments later, or moments before, pass the same or a different print head to print content. It is, however, preferred to print content and pattern line by line in the same pass of rasterised printing. In the case of page printing (a whole page is printed with one colour/ink at one moment, and its whole page with a different colour/ink at another moment, the pattern may be printed before or after content colours are printed.

Preferably the method comprises a user selecting the content to be printed from a pre-existing set of a plurality of different content options and/or creating the content immediately prior to printing the article.

By "immediately prior to printing the article" we mean that the content was created by the user during a current operation session on their computer, or other content-creation machine, rather than being retrieved from memory storage where it pre-existed before a current user operational session on their computer/content machine. Of course, we also want to protect retrieving content from memory and printing that. A user may retrieve content from memory and delete at least some content, add additional content, or alter retrieved content, prior to printing.

There may be a library of pre-existing content and a user may retrieve pattern from that library held in memory. A user may design printing (e.g. a form or document) to be printed on an article. For example they may select/control where in an article pattern will appear and/or where content will appear and/or the nature of the content itself. Content may be printed adjacent pattern and/or content and pattern may be superposed.

The method preferably comprises sending print instructions from a computer such as a PC, server, laptop, PDA, etc. to a printer from the group: inkjet, laser, LCD, LED, LEP gel printer, toner-based printer.

The method may comprise designing or composing print content and/or layout prior to sending it for printing. Information regarding the content and pattern may be sent to the printer via digital telecommunications, for example over hardwired links, or wireless links; preferably over a LAN, or MAN.

In an office computer network provided in a building having a plurality of user computer stations and at least one printer linked to the network, and a computer processor having pattern allocation capabilities, the method may comprise a user in the building using their computer station to access a pattern and to select or create content and to cause pattern and content to be sent to the printer and for the pattern and content to be printed on the document together, thereby enabling a user to select or create and print-out substantially in real time documents having both pattern and content.

A common pattern-allocation server may manage the allocation of pattern to print operations, and record and association of what content was printed on what pattern, for multiple, or all, user computer stations.

Of course, there may not be a network as such: one user computer attached to a printer can perform the method of some aspects of the invention.

The above operation is quite different to a user having to pre-order documents from a remote printing factory and have them delivered to the user later, with significant delay (days, or a week or more). A user can decide that they want a document and print it out there and then.

The computer station may comprise a PC, laptop, etc. or a "dumb" terminal linked to a server. The computer processor may reside in a user's PC or terminal, or in a shared server/computer, shared between a plurality of users. In some examples the processor, or part of the processor, may reside in the printer.

In preferred embodiments the pattern is printed using black ink which absorbs at an infra-red wavelength. The content may be printed using a black ink that is not significantly absorbing at said infra-red wavelength. All of the content on a page or document may be printed using black ink that does not significantly absorb at said infra-red wavelength, or at least such content that overlies pattern may be so printed. It may not matter whether content that is far enough away from pattern is printed with I.R. absorbing ink or not.

When the pattern is printed using a black ink that is absorptive at said infra-red/non-visible wavelength, black content may be produced either by using a black ink that is not significantly absorptive at said infra-red/non-visible wavelength, or by using a plurality of coloured inks that are non-absorptive at said infra-red/non-visible wavelength and which when mixed colour black. Content that is not superposed with pattern may be printed with I.R./non-invisible absorptive ink (such as is used to print pattern).

According to another aspect the invention comprises a method of printing a printed article having both a human-discernable black-coloured content, and a machine-determinable position determining pattern printed in black ink and detectable at a non-visible wavelength, preferably infra-red, the method comprising printing the content and pattern using a printer that has two black inks: a first black ink that is used to print the pattern and which absorbs radiation at said non-visible wavelength; and a second black ink that does not significantly absorb radiation at said non-visible wavelength.

All of the content of a document may be printed with said second black ink. Alternatively, at least, or only, those parts of a content that are superposed with pattern may be printed with said second black ink. Other parts of content, not superposed with pattern may, or may not, be printed with said first black ink.

Preferably, the printer also has at least three inks of other colours so as to enable content having a range of colours to be printed.

Preferably the method comprises taking an existing printer having five or more colour channels and providing the first and second black inks to two of the channels and three different colours to three of the other channels.

Six-colour printers are known, for example the HP DJ 10 PS. Five of the colour channels/slots of the printer may be used as described. The sixth channel/slot may be unused or could be used for a spot colour (a colour that is likely to be popular). In this way, by providing a new ink set to the existing printer we can achieve print-on-demand, one print operation, printing of full colour documents that have Anoto-type dot patterns that are IR detectable by an Anoto-type pen, without the pen being confused by the human-discernable content.

Furthermore, four-colour printers are widely known. They typically have CMYK (cyan, magenta, yellow and black) inks as an ink set. For monochrome printing (and a lot of printing, especially in an office environment, is black and white monochrome printing), we could provide a four-colour digital printer with K1 and K2 (two blacks), one black ink being absorptive at said non-visible wavelength and the other not. The other two slots may be unused or also may have K1, K2—i.e. two channels of each kind of black, or one or two different, non-black, colours could be used in them. This would give a range of colour capability, but not full-colour, from a four-channel printer. We could convert a four-colour printer into a two-black monochrome printer, or one with two different blacks and one or two other colours.

According to another aspect the invention comprises a method of printing both machine-readable position-determining pattern in black ink and human-discernable content in black ink by using a multi-colour channel printer using a first black ink in one channel that is absorptive at a non-visible wavelength and using a second black ink in a second channel that is not substantially absorptive at said non-visible wavelength.

The method may comprise, in a printer having a black channel plus n colour channels, having at least two black channels and n-1 colour channels. There may be only two black channels: there may be no need for more than two blacks.

Of course, the position-determining pattern does not have to be printed in ink that is black at visible wavelengths. It could be printed in cyan, magenta, yellow (or one of the primary colours of an ink set), or an invisible ink, or in another colour (at visible wavelengths), possibly a less immediately visible colour than black. Black is a good choice because infra-red absorbing black inks exist and are reasonably priced. A paler colour may be less intrusive to a human looking at the printed article.

Alternatively, more than two channels may be occupied by black ink. For example, in a four-colour printer, two channels could be used for non-visible wavelength absorption black ink and two channels for black ink that is transparent at said non-visible wavelength.

Other printers with several colour channels exist. For example, many LEP printers have six, seven, or eight colour channels, one or more of which can be used for non-visible absorptive (e.g. I.R.) ink with alternative properties, possibly black ink which absorbs at a non-visible wavelength.

The term "ink" is meant to include liquid inks, and powder inks (e.g. toner that needs heat to fuse to a page/surface) and gels: it is not used in a sense to restrict its physical form. Ink marks an article to be printed and its application can be controlled by the printer.

Offset printing, in one operation, is not excluded, nor is dot matrix printing. However, they are not currently seen as being preferred options: but they are still options.

According to another aspect the invention comprises a method of printing a printed article having both a human-discernable content in full colour, and a machine-determinable position determining pattern detectable at a non-visible wavelength, the method comprising using a four-colour digital printer and using machine-detectable ink in one channel that is machine-detectable and absorbs radiation at a non-visible wavelength, and first, second, and third complementary colour inks in the other three ink channels, the complementary colour inks not absorbing radiation at said non-visible wavelength, and wherein content that is of the colour black is printed by mixing the three complementary colour inks.

There are a large number of printers in existence now. For example, inkjet printers, laser printers (including LED,LCD), LEP (Liquid Electro Photography), dot matrix, daisy wheel, etc. Some have more than one ink or colour channels. For example there are many four-channel colour inkjet printers which have CMYK colour channels (Cyan, Magenta, Yellow, Black). There are hexichrome inkjet printers, such as the HP DJ 10 PS which have six colour channels. LEP printers typically house six, seven or eight colour channels. For printers that have more than four channels it is known to have CMYK and one or more spot colours (colours of a particular hue that is it known will be required frequently). The HP DJ 10 PS is often configured to have CMYK and light cyan ($C_L$) and light magenta ($M_L$) as its colours.

In one aspect the invention comprises a method of printing an article having both human-discernable content and machine-determinable position-determining pattern detectable at a non-visible wavelength comprising, in an existing digital printer having a plurality of colour channels, using a first ink in a first colour channel of said printer which is absorbent at said non-visible wavelength and printing said pattern using said first colour channel, and using a second ink of the same colour as the first ink in a second colour channel of said printer which does not significantly absorb at said non-visible wavelength and printing at least said content which overlies pattern using said second colour channel.

The printer may have a third or additional colour channels and the method may comprise using a third or additional inks in said third or additional colour channels. When said ink is used in an nth colour channel which is substantially non-absorbing at said non-visible wavelength said nth channel may be used to print content, as well as said second channel. When ink is used in a kth colour channel which absorbs significantly at said non-visible wavelength said kth channel may be used to print pattern, as well as said first colour channel.

The method may comprise replacing an existing ink cartridge (or toner cartridge, but ink cartridge is meant to cover ink, toner, gel, other printing substances) in said printer which has no ink which absorbs in non-visible wavelengths with an ink cartridge which does have an ink which does absorb at said non-visible wavelength.

Alternatively, the method may comprise replacing an ink cartridge with ink which does absorb at said non-visible wavelength with one that does not.

Alternatively the method may comprise replacing an ink cartridge which has ink that may or may not absorb at said non-visible wavelength with ink which does not, which ink is substantially the same colour as an ink in the printer that does absorb.

The method may comprise using a machine-detectable black ink cartridge in the printer which has black ink which absorbs said non-visible wavelength.

The method may comprise altering software on a printer driver, or installing new printer driver software, to print pattern exclusively from one channel, or a limited selected number of channels, of the printer.

In a hexichrome printer originally intended to print six colours, an aspect of the invention comprises using a first ink of a first kind in a first colour channel to print machine-readable position-determining pattern, and using at least four other colour channels to print human-discernable full colour content using three complementary colour inks and a black ink, the inks used to print content being of a second kind; ink of the first kind absorbing at an infra-red wavelength, and ink of said second kind not absorbing at said infra-red wavelength significantly.

The first ink may comprise a black ink. The printer may use cyan, magenta, yellow and black inks of the second kind. The printer may use light cyan (or light magenta) as well. The printer may use an infra-red absorbing ink, said first ink of the first kind, in place of a light magenta ink (or in place of light cyan).

In a four-colour inkjet printer it is known to have one ink cartridge having black ink and a second ink cartridge having cyan, magenta and yellow (or three other complementary colour inks).

In one aspect the invention comprises using in a four colour printer a black ink cartridge which has infra-red absorbing pigment based ink and using a three-colour ink cartridge, pattern being printed from the infra-red absorbing black ink cartridge and content being printed using the colour ink cartridge. Black content may be produced using the colour ink cartridge, the black ink cartridge containing infra-red absorbing ink, being used exclusively for printing patterns.

Other known four-channel inkjet printers have a black ink cartridge and three separate coloured ink cartridges, again typically cyan, magenta and yellow. In one aspect the invention comprises using a black ink cartridge containing infra-red absorbing ink and using that to print pattern exclusively; content, including black content if present, being printed using the other colour ink cartridges, which does not contain infra-red absorbing ink.

Monochrome laser printers typically have only a black ink cartridge in them (i.e. only one ink cartridge). It is possible to print content and pattern using such an existing printer, but it is not a preferred option. It is possible to print pattern using a first ink cartridge containing a first ink (e.g. black ink) that is infra-red absorbing, and then change the first cartridge for a second cartridge that contains "normal" ink (e.g. black ink) that is not infra-red absorbing, possibly passing the article through the printer again. However, this is not preferred since it requires human intervention/action to change the print cartridge: it is not simply sending a job electronically to print at a printer and then picking it up a few seconds later.

However, four-colour laser printers exist, typically having a black ink cartridge/toner cartridge (but again "ink" covers "toner"), and three complementary colour ink cartridges, for example cyan, magenta and yellow.

In one aspect, the invention comprises taking a four-colour laser printer and using an ink cartridge with ink of a first kind that is infra-red absorbing for one colour channel, and using an ink cartridge, or ink cartridges, in at least one other colour channel(s) that contains ink of a second kind that is not infra-red absorbing, and printing machine-readable position-determining pattern using the one colour channel, and using ink from the second kind from the other colour channel(s) to print the content.

All three of the other colour channels may use ink of the second kind. For example, they may use cyan, magenta and yellow ink.

Laser printers are electrophotographic in nature and the same sheet of paper (or other article) is passed over an electrostatic mask-generated image of toner/ink. Each colour has its own electrostatic mask generated and its own passage of the paper past its monochrome image. There may be only one mask roller and the same sheet of paper may be passed past the mask roller a number of times: for example, one for each colour ink that is to be applied to the paper.

This is still considered a single printing operation, and "one pass", in the sense that it all happens automatically and in a short space of time (of the order of second or a few seconds). The paper is not transferred to a separate, different, printing machine.

In another possible variant, a laser printer may have more than one electrostatic mask roller each associated with a respective colour ink. In aspects of the present invention one or some of the inks may be of the first ink and one or some of the second kind.

"Laser printers" also include Light Emitting Diode printers and Liquid Crystal Display printers: they all use light to charge/uncharged an electrostatic printing mask.

Photocopiers can also be considered as printers. The difference between an electrostatic, toner-based, photocopier and a laser printer is not significant for many aspects of the invention. Indeed, it is not uncommon for computers, e.g. PCs to be configured to print from photocopiers.

Ink-jet printing involves the ejection of fine droplets of ink onto a print medium such as paper, transparency film, or textiles in response to electrical signals generated by a microprocessor. There are two basic means currently available for achieving ink droplet ejection in ink-jet printing: thermally and piezoelectrically. In piezoelectric ink-jet printing, the ink droplets are ejected due to the vibrations of piezoelectric crystals, again in response to electrical signals generated by the microprocessor.

In thermal ink-jet printing, an ink-jet image is formed when a precise pattern of dots is ejected from drop generating device known as a "printhead" onto a printing medium. The typical ink-jet printhead has an array of precisely formed nozzles (or ejector portions) attached to a thermal ink-jet printhead substrate, such as silicon, nickel, or polyamide, or a combination thereof. The substrate incorporates an array of firing chambers or drop ejector portions that receive liquid ink (colourants dissolved or dispersed in a solvent) through fluid communication with one or more ink reservoir. Each firing has a film resistor, known as a "firing resistor" located opposite the nozzle so ink can collect between the firing resistor and the nozzle. The printhead is mounted on a carriage that travels along the width of the printer (otherwise referred to as the "scan axis").

Commercially available thermal ink-jet printers (such as Deskjet® and DesignJet® printers available from Hewlett-Packard Company), use inks of differing hues namely, magenta (M), yellow (Y), and cyan (C), and optionally black (K). The particular set of colourants, e.g., dyes, used to make the inks is called a "primary dye set". A spectrum of colours e.g. secondary colours, can be generated using different combinations of the primary dye set. Ink-jet or laser printers may also use additional inks, for example light cyan (Lc) and light magenta (Lm).

One category of ink-jet printers utilises disposable printheads in which the ink reservoirs are on-board the carriage, thus the term on-board or on-axis. The reservoirs can be formed integrally with the printhead portions or they can be detachably connected thereto.

Another category of ink-jet printers employs ink reservoirs that are not located on the carriage, thus the term off-board or off-axis. In one case, the reservoir intermittently replenishes the printhead with ink when the printhead travels to a stationery reservoir periodically for replenishment. Another type makes use of a replaceable ink reservoir connected to the printhead by a fluid conduit. The printhead is replenished with ink through this fluid conduit.

The reservoirs may be individually (separate from other reservoirs) replaceable or the reservoirs can be formed as one integral reservoir portion, to be replaced as a unit.

Different printhead/ink reservoir configurations address different customer needs. For example, on-board designs provide for ease of use. Printers using the off-board designs provide for fewer interruptions during printing jobs which require larger ink volumes, such as large format printing.

In general, a successful ink set for colour ink-jet printing should have the following properties: good crusting resistance, good stability, the proper viscosity, the proper surface tension, good colour-to-colour bleed alleviation, rapid dry time, no negative reaction with the carrier consumer-safety, and low strike-through. When placed into a thermal ink-jet system, the ink set should also be cogation-resistant.

According to another aspect the invention comprises an ink set comprising a first ink which absorbs at a non-visible wavelength; and a second ink of substantially the same colour as said first ink and which does not significantly absorb at said non-visible wavelength, said ink set being provided in, or for use in, a single printer.

Both inks may be black inks.

According to another aspect, the invention comprises the use of an ink set in accordance with the above aspect of the invention in printing both a machine-readable position-determining pattern and human-discernable content upon an article in a single printing operation.

When the aspect of the invention comprises an ink set, the ink set may include at least one of:—

(i) a second ink of a second kind, of a different colour to a first ink of the second kind, said inks of said second kind being such as not to absorb significantly at said non-visible wavelength;
(ii) at least three inks of different colours of the second kind;
(iii) a black ink of a first kind and a black ink of the second kind, and optionally also at least one ink of the second kind of a different colour;
(iv) a black ink of the first kind and a black ink of the second kind and at least three other inks of the second kind of different colours.

An ink set may be provided in a single ink cartridge, or in a plurality of ink cartridges. When provided in a plurality of ink cartridges, the ink of the first kind may be in one ink cartridge and ink of the second kind in another ink cartridge. Each different ink may be provided in its own cartridge. Two ink cartridges may be provided as a set or package, one cartridge having ink of the first kind and no ink of the second kind, and the other having either (i) ink of the second kind and no ink of the first kind, or (ii) ink of both the first and second kinds.

In some circumstances, it may be desirable to ensure that the pattern is printed with ink that is visible. Otherwise, a user may not be able to tell at a quick look whether the article, e.g. page or document, has a machine-readable position-determining pattern on it or not.

The method of any preceding aspect may include a user sending a document or image from a computer, such as a personal computer, digitally to a local digital printer, printing the document or image onto a sheet of paper or other article at the printer. The user may retrieve the document or other article from the printer (e.g. themselves, or it may be done for them).

Typically the user will retrieve the printed document or article from the printer a short time after sending it to print, for example a matter of minutes, or less, or a mater of hours later. Typically, the user will either reach out to take the printed document from a printer within arm's reach of their computer station, or get up and walk to the printer to retrieve the document. Someone else, e.g. their secretary, may retrieve the document from a printer for a user and walk to the user with the printed document, again a short time after the document is printed.

This is quite different to having to have printed paper delivered to a user by road transport (e.g. by lorry), some days or weeks after it is ordered.

According to another aspect, the invention comprises a printer having a first ink of a first kind that absorbs electromagnetic radiation at a non-visible wavelength and a second ink of a second kind that does not absorb significantly at said non-visible wavelength and is visible at a visible wavelength, the printer being adapted to respond to control signals to print an article having machine-readable position-determining pattern in the first ink and human-discernable content in the second ink, and said first and second inks being of substantially the same colour (e.g. black).

The printer is in one aspect of the invention actually in use printing said article.

The printer may have a removable and replaceable cartridge of ink of the first kind and/or a removable and replaceable cartridge of ink of the second kind.

The first and second inks may both be coloured black, or each be of a very dark hue. The printer may have one cartridge of ink of the first kind and another cartridge containing a plurality of inks of different colours (visible) of the second kind. There may be a plurality of inks of the first kind in an ink cartridge, possibly of different colours, possibly of the same colour. A single cartridge may have both ink of the first kind and ink of the second kind.

The cartridge may be an inkjet cartridge, or a laser jet cartridge, or an LEP cartridge. These are non-exhaustive examples.

The printer may have a printing carriage or roller that moves relative to a sheet of paper/article in use. The printer may feed paper/article past a printing head or station.

The printer may have a plurality of colour channels, for example four, six, or more. One colour channel, possibly only one colour channel, may contain ink of the first kind and other colour channels, possibly all of the other colour channels, may contain ink of the second kind. At least one colour channel may not contain any ink. The printer may contain at least complementary colours adapted to print in full colour.

The printer may have inks of the first and second kind of substantially the same colour in visible light, possibly, but not necessarily, black. A lighter colour may make the pattern less intrusive, but still discernable if someone looks for it. Yellow, or light magenta, or other pale colour, possibly a colour provided as an ink already available, may be chosen.

The printer may have a plurality of inks of different colour, and in some embodiments only one of them is of the first kind. The printer may have inks of the first and second kind, all of the inks being of substantially the same colour (e.g. black).

According to another aspect the invention comprises a local area network comprising a plurality of computer terminals networked to at least one printer, the printer being in accordance with the preceding aspect of the invention, and wherein the computer terminals are adapted to send a request for a document to be printed to one or more printers on said network, and said printer(s) are adapted to receive that request and to print a document pursuant thereto; said computers being adapted to generate a request for said document to be printed including instructions adapted to cause said printer to print machine-readable position-determining pattern on said document in an ink that absorbs at a non-visible wavelength, and also including instructions adapted to cause human-discernable content to be printed on said document in an ink that is not absorbent at said non-visible wavelength, and aid printer(s) being adapted to be responsive to receive of such instructions to print a document having said pattern and said content.

The LAN may be provided within a single building.

The content may comprise one or more of:—
(i) words/text
(ii) pictures/drawings
(iii) photographs/representations of photographs
(iv) artwork
(v) borders, lines, decorative features.

The LAN may include a server or other processor that has a memory containing details of regions of pattern and which is capable of allocating selected, and after selection known, regions of the pattern to be printed upon a specific document, and of causing a request to print a document with pattern to print pattern allocated to that document by said server or processor.

The user computer station and/or the server may send actual pattern data to the printer, or not the pattern itself, but instead an identifier/precursor which the printer uses to identify which pattern to print or to generate to pattern.

The server may send the pattern or pattern identifier directly to the printer or to the user's computer for onward transmission to the printer.

A method of producing a printer in accordance with a previous aspect of the invention comprising taking an existing printer having at least one ink cartridge and replacing an existing ink cartridge with a new ink cartridge that has first ink of the first kind in it.

In a hexichrome printer, the method may comprise retaining existing CYMK inks, or ink cartridges, and replacing one of the other inks, or ink cartridges, with ink of the first kind, or a cartridge having ink of the first kind.

In a printer having more than four inks of the second kind, the method may comprise changing at least one of the inks for an ink of the first kind.

According to another aspect the invention comprises an article printed using a digital printer having a position-determining pattern printed using ink that can be machine-detected at a non-visible wavelength, and human-discernable content printed using visible ink that is not significantly detectable at said non-visible wavelength, said pattern and content being printed in the same print operation of the digital printer.

According to another aspect the invention comprises a method of printing an article with a position-determining pattern that is machine-readable at a non-visible wavelength and with human-discernable content comprising taking a RGB version of an image from a computer and isolating the pattern in its own colour plane during colour separation, content being printed with other available colour planes not including said pattern colour plane.

Content colour plane data may undergo a half-toning and masking operation in order to determine what content, if any, is printed at each pixel of the printing operation. Pattern colour plane data may bypass a half-toning operation. Pattern pixels may either be "on" or "off", with no shades of intensity between those extremes. Pattern colour plane data may be sent from a colour separation stage directly to a masking stage, or even directly to a printer.

According to another aspect the invention comprises a method of printing on demand a page or other article with both a machine-readable position-determining pattern readable at a non-visible wavelength and also human-discernable content using a single digital printer responsive to a print command from a user's processor, the method comprising having content data and pattern data and processing the content data differently from the pattern data using software.

The pattern may comprise dots, which may have a generally round shape or which may not necessarily be round.

According to another aspect the invention comprises a method of printing on demand a page or other article with both a machine-readable position-determining pattern readable at a non-visible wavelength and also human-discernable content using a single digital printer responsive to a print commend from a user's processor, the method comprising treating the pattern as text content in a printer driver, and printing the pattern using exclusively one ink that is readable by a machine at said non-visible wavelength, or exclusively using a plurality of inks that are readable at said non-visible wavelength, and printing the content using exclusively an ink, or inks, that are not machine-readable at said non-visible wavelength.

According to another aspect the invention comprises a method of reducing problems experienced by an infra-red digital pen in determining a position in a dot pattern, the pen having an infra-red sensor and a camera adapted to recognise a position in a dot position-determining pattern printed in ink that is detectable on a page or sheet at an infra-red wavelength, the method using a digital printer to print the page or sheet on demand from a user in a single print operation, the dot pattern printed with infra-red absorbing black ink, and human-discernable content, printed using black ink that is not infra-red absorbing significantly as observed by said pen.

By "black ink" is meant any of: truly black ink; a dark ink e.g. blue or brown or red; a light ink e.g. green, or yellow. In many embodiments a true black is meant.

According to another aspect the invention comprises the use of an ink set in a digital printer to print out both machine-readable pattern adapted to enable a digital pen to determine its position in the pattern in a first ink, and to print human-discernable content in a second ink, the first ink comprising a black pigment based ink which absorbs at an infra-red wavelength and the second ink comprises a black dye based ink which does not absorb significantly at said infra-red wavelength.

According to another aspect the invention comprises a computer programme product, which when used on a computer processor controlling a printing operation of a digital printer having a first infra-red absorbing ink and a second ink that does not absorb significantly at absorption wavelength of the first ink, causes a printer controlled by the processor to print a machine-readable pattern using the first ink and not the second ink and a human discernable content using the second ink and not the first ink.

According to another aspect of the invention there is provided a print control system comprising a receiving means arranged to receive RGB signals and identification signals, a transmitting means arranged to transmit colour values for a plurality of colour channels, a plurality of translating means arranged to translate said RGB signals into said colour values, and a selecting means arranged to select one of said plurality of translating means using a said identification signal.

The realisation that it is possible to print documents with a position-determining dot pattern and human discernable content contemporaneously and locally—i.e. in one print operation on demand—from commercially available printers (machines) is part of the present invention. Existing machines may require new ink sets and/or new printing control software/firmware. Previously people had simply accepted being tied into using pre-determined pre-printed and pre-planned documents obtained from a limited number of approved suppliers, despite the self-evident commercial disadvantages of this.

Since making the invention we have become aware of WO 02/082366 which discloses using an inkjet printer with an I.R. absorbing black ink and CMY, the black ink being used for pattern and all content on the page being printed with CMY only. Printing content, especially in black ink, using a mix of colours can result in poor colour intensity/quality.

BRIEF DESCRIPTION OF THE DRAWINGS

Embodiments of the invention will now be described by way of example only, with reference to the accompanying drawings, of which:—

FIG. 11A shows an example of a LUT used for printing a document with content only and no Anoto pattern;

FIG. 11B shows an example of a LUT used for printing a document containing both content and an Anoto pattern;

FIG. 15B shows modifications of the embodiment of FIG. 15a;

DETAILED DESCRIPTION OF SOME EMBODIMENTS OF THE INVENTION

Figure 5:
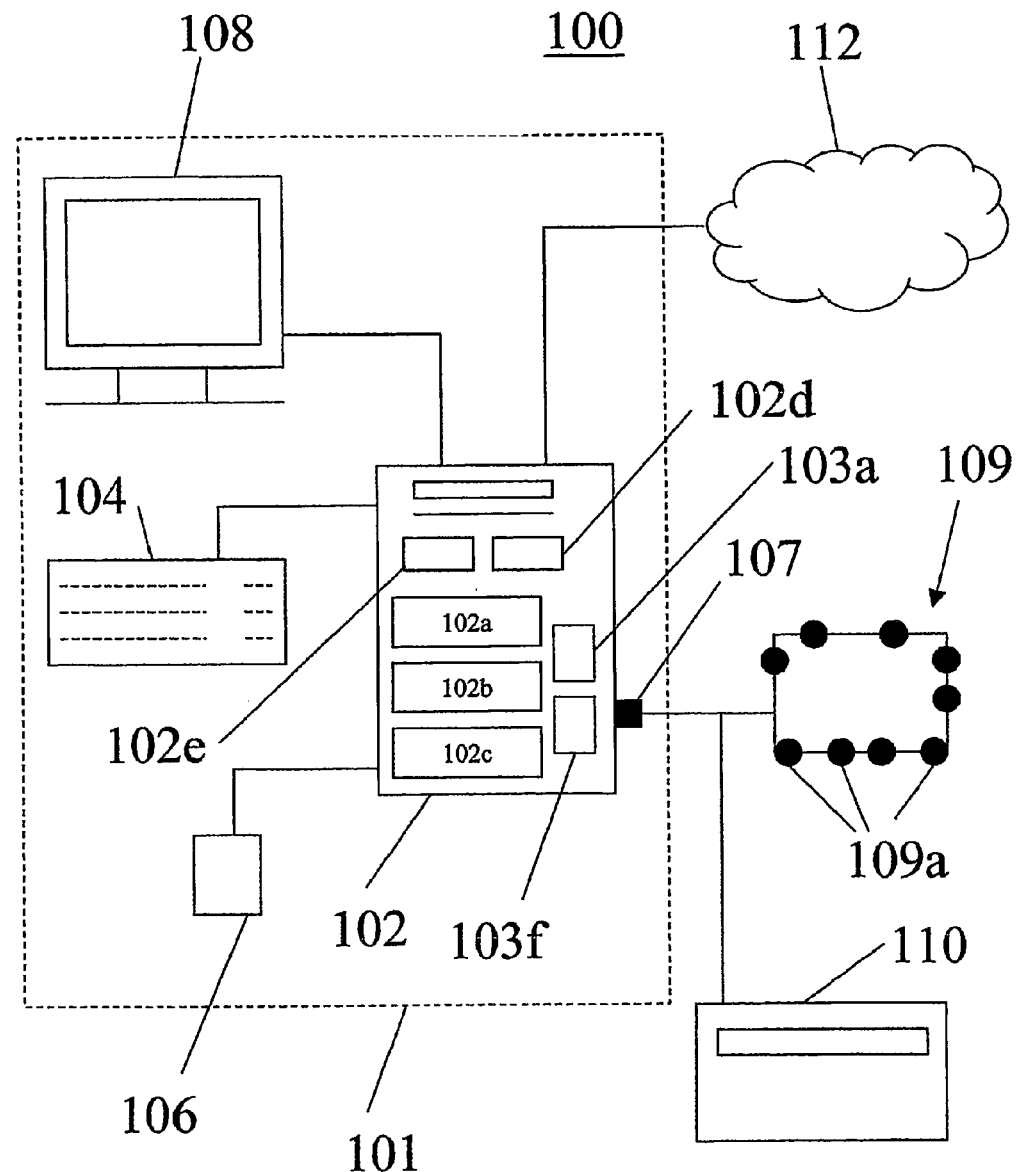
FIG. 5 shows schematically one example of a new print-on-demand system for creating and printing a document that has an Anoto pattern and human readable content.

It will be helpful to discuss examples of different levels of technical complexity FIG. 5 is a schematic illustration of a system 100 for printing a document having content that is visible and a pattern that absorbs light at non-visible wavelengths (e.g. at an infra-red wavelength). The system 100 comprises a workstation 101 including a personal computer (PC) 102 which is connected to a local printer 110. The PC 102 may also be connected to the Internet 112. The workstation 102 includes a user interface including a screen 108, a keyboard 104 and a mouse 106. The PC 102 has as a processor 102a, a memory 102b, and I/O software devices 102c by means of which the processor communicates with the screen 108, the keyboard 104 and the mouse 106 and a communications port 107 by means of which it communicates with the Internet 112 or a local network such as a LAN 109 having peripheral devices and/or other computers (e.g. PCs) 109a.

Figure 6:
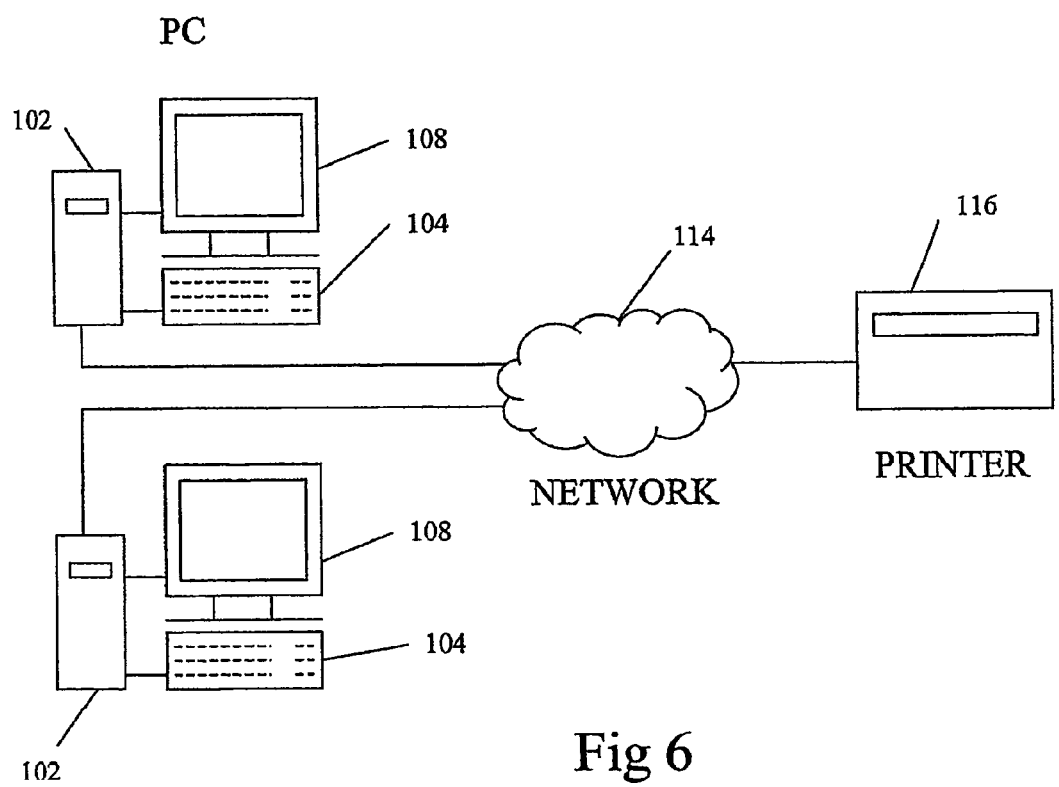
FIG. 6 shows schematically a variation of the system shown in FIG. 5.

FIG. 6 is a schematic illustration of the system 100 in which two or more PCs 102 are networked together, for example by a LAN 114. The PCs 102 each have access to a shared networked printer 116 via the LAN 114.

The PC 102 is arranged to generate electronic digital documents that comprise a pattern 12 of dots 14 and human-discernable content. Such documents have already been described with reference to FIGS. 1 to 4.

Figure 1:
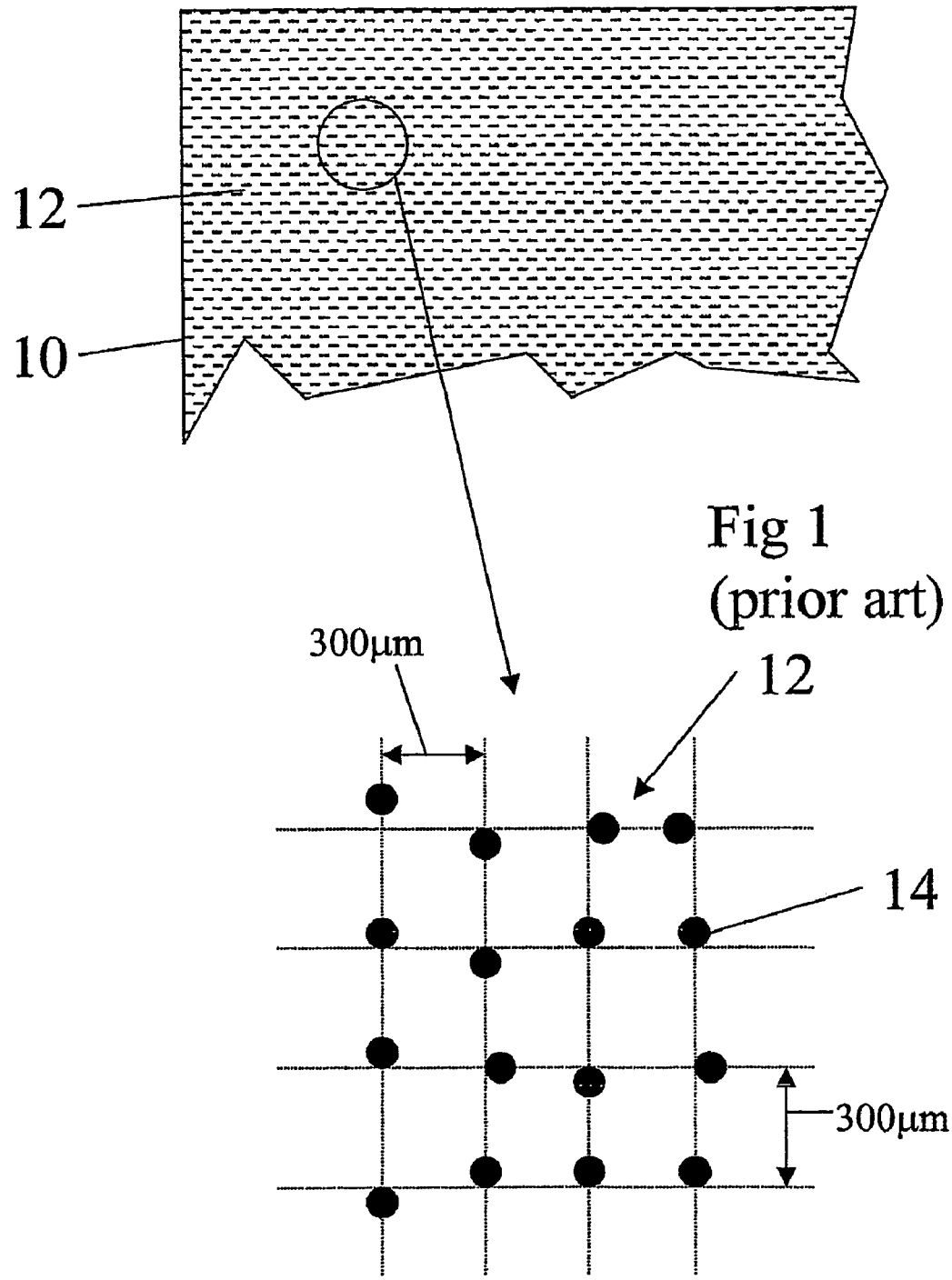
FIG. 1 shows schematically a sheet of Anoto digital paper.
Figure 2:
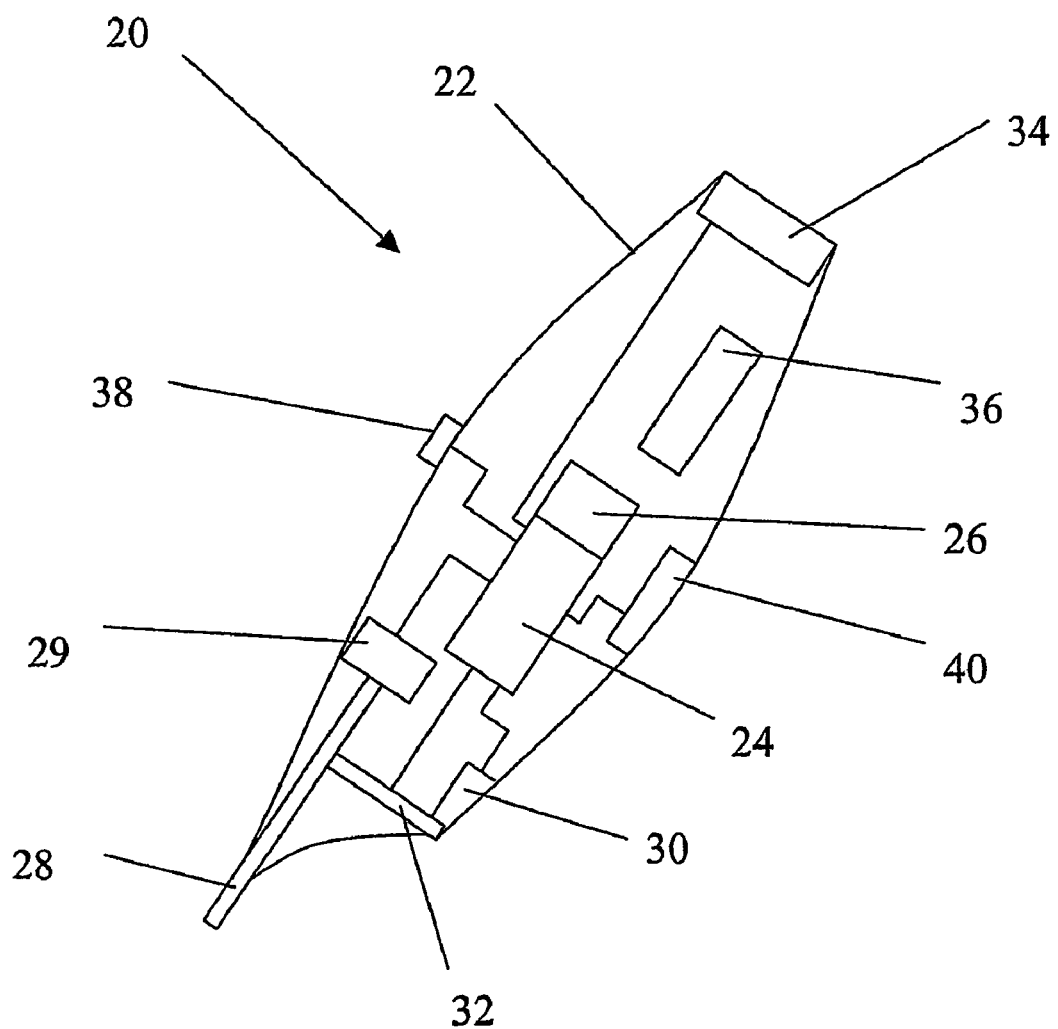
FIG. 2 shows schematically a known digital pen.
Figure 3:
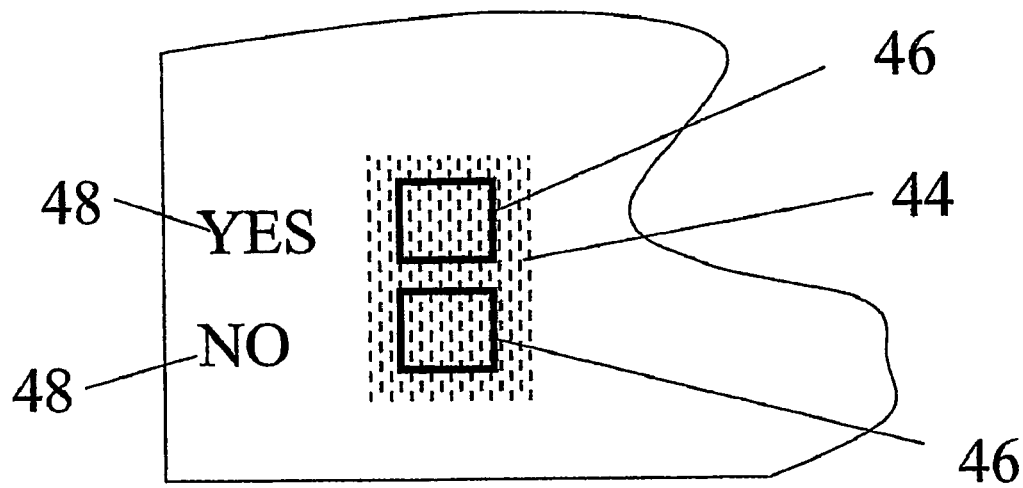
FIG. 3 shows schematically a first example of a sheet of Anoto digital paper having human readable content.
Figure 4:
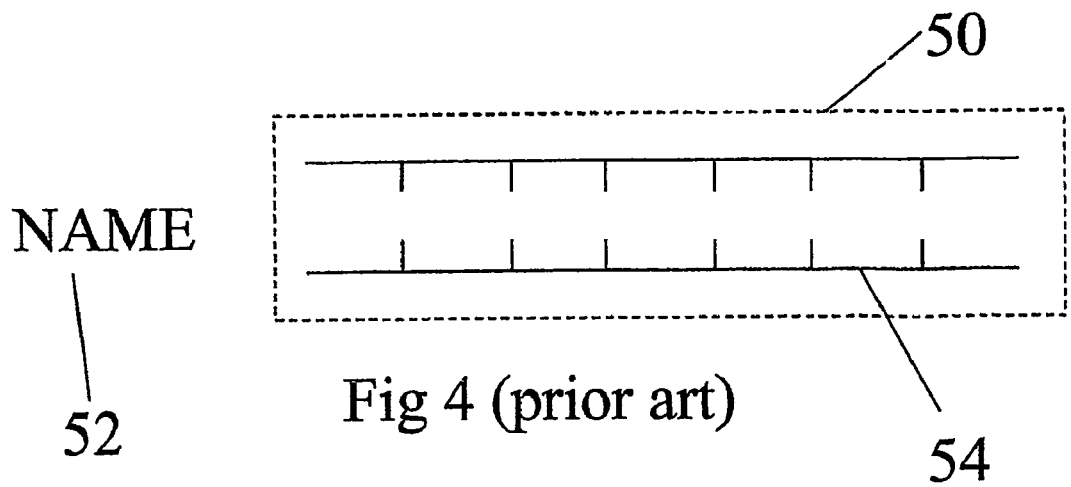
FIG. 4 shows schematically a second example of a sheet of Anoto digital paper having human readable content.
Figure 7A:
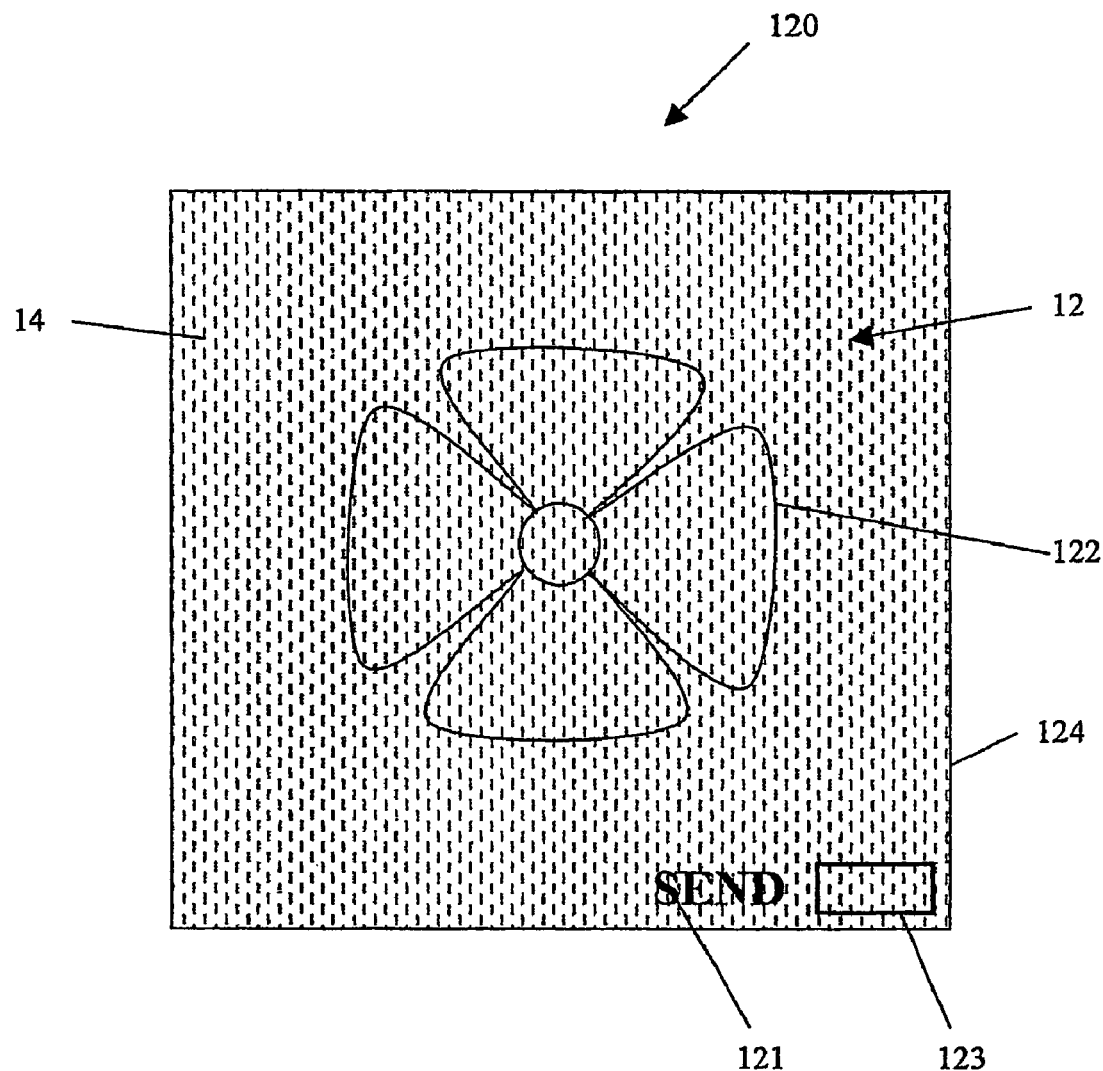
FIG. 7A shows schematically an example of a document printed by the system shown in FIG. 5 or FIG. 6.

FIG. 7A is a schematic view of a hard (paper) copy of such a digital document. This hard copy is for use in a digital pen and paper system. Such a hard copy will sometimes be referred to herein as an "Anoto-type functional document", or a "pattern and content document". However, it will be appreciated that the invention is not restricted to use with any proprietary system. The hard copy comprises a carrier 124 in the form of a single sheet of paper with the pattern 12 printed. Also printed on the paper 124 are further markings 121, 122, 123 which are clearly visible to a human user of the form, and which make up the content of the document. In the example illustrated the content is an illustration of a flower 122, the word "SEND" 121 and a box 123. The nature and amount of the content will depend entirely on the intended use of the document and may, for example, have significantly more text. A user may, for example, order a garment printed with the flower as decoration by ticking the box 123 with a digital pen 20 and communicating the pen with their PC to order the garment over the Internet. The box 123 is associated with a functional activity, and marking in the box 123 with a digital pen 20, as illustrated in FIG. 2, can be seen as instructing the PC 102 to carry out the associated functional activity.

The PC's 102 user interface allows a user to the view electronic versions of digital documents to be printed, using a software application, referenced 102d in FIG. 5, on the screen 108, and to make modifications to them prior to printing them. The user interface includes the keyboard 104 and mouse 106 and software (not shown) for processing inputs from them, as well as the screen 108 and software 102e for producing the content, e.g. images and/or text, on the screen. The software application 102d has access to a database 103a of pattern data for use with Anoto-type functional documents. The database 103a may also have user names and identification numbers, which are in use associated with each particular document 120 at the time of printing of the document 120 and are printed out with the document 120. This database 103a may be on the PC or elsewhere on the network, for example on a local file server or on the Internet.

An already existing, previously designed, document may be accessed from a database of such documents. Alternatively, the document may be designed by the user.

Figure 7B:
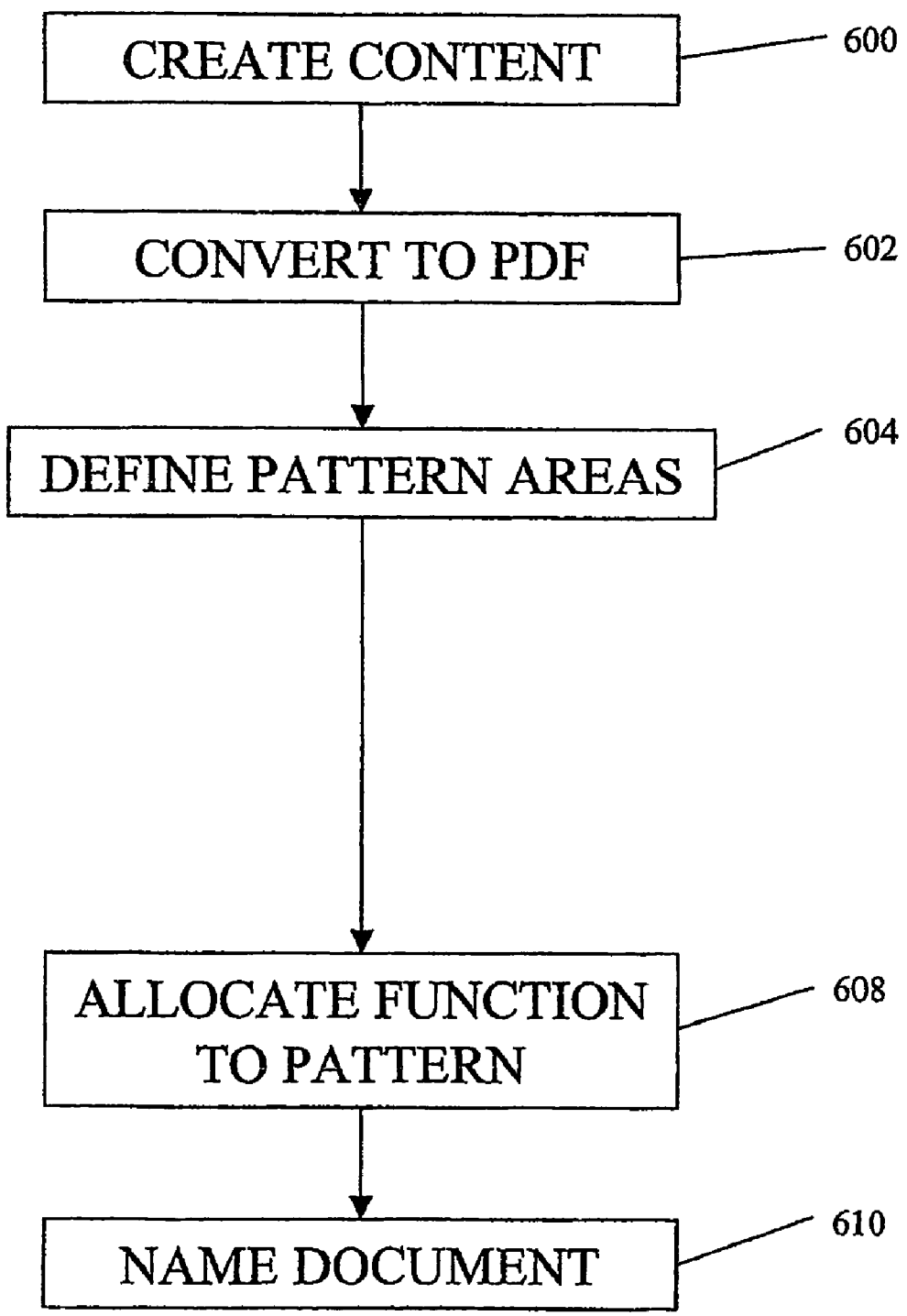
FIG. 7B is a flow diagram showing one embodiment of a method of designing the electronic document shown in FIG. 7.

FIG. 7B is a flow diagram showing a method of designing an electronic digital document having both pattern and content. This starts at step 600 with the design of the human-discernable content of the document. The design work is carried out on the PC using a software application. In this case the application is Acrobat Reader and the PC 102 also runs a number of other applications including a word processing package such as 'Word' a database package such as 'Access', and a spreadsheet package such as 'Excel'. Each of these applications can be used to design the content of the document. The content is therefore converted to PDF format at step 602. The machine-readable pattern areas are then defined at step 604 to design a digital document defining both the human-discernable content and the positions and shapes of the pattern areas.

Figure 7C:
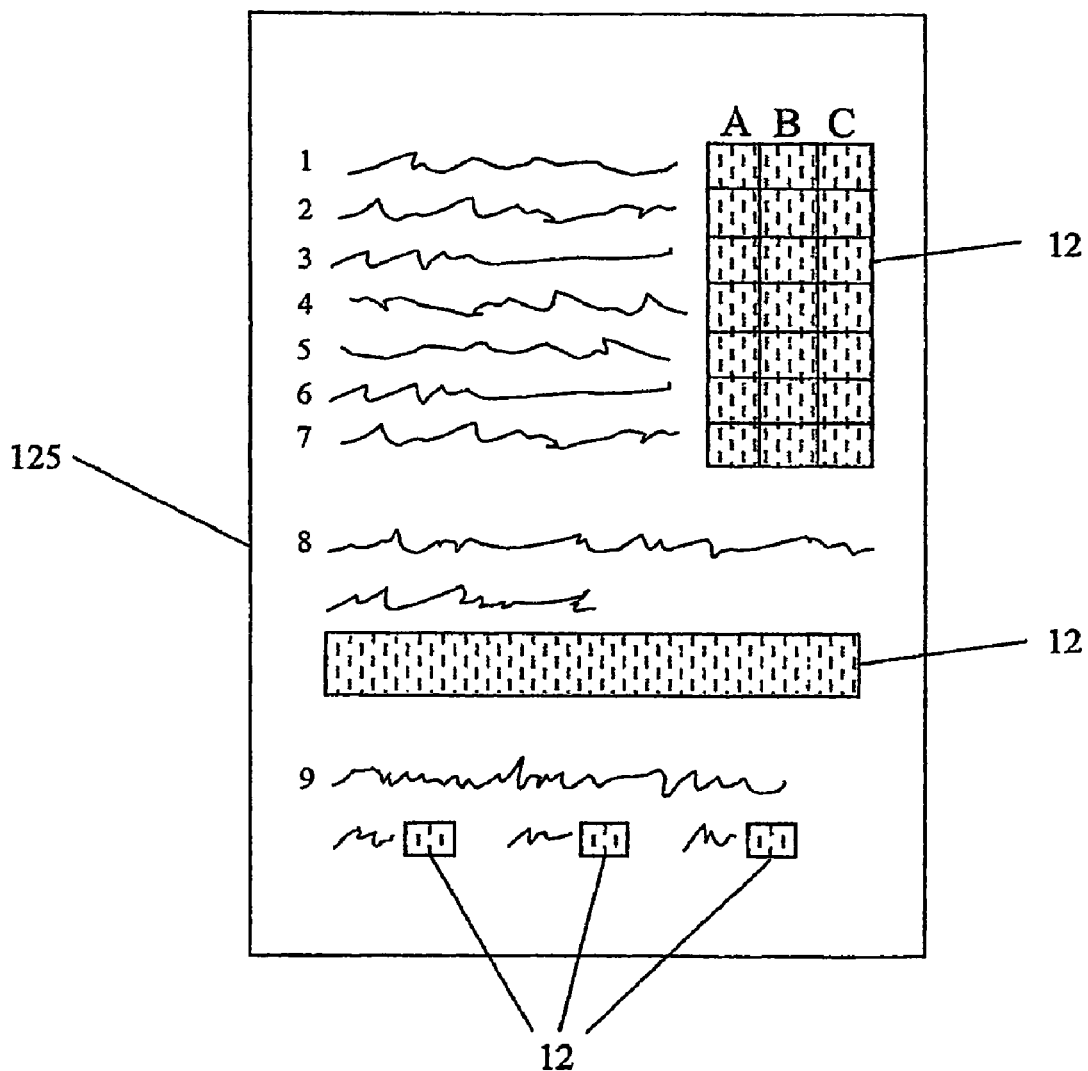
FIG. 7C shows schematically an alternative document printed by the system shown in FIG. 5 or FIG. 6.

An area of pattern is then allocated to the document from a virtual pattern space stored in the database. In the example illustrated in FIG. 7A, a pattern area is allocated that will cover substantially all of the sheet of paper 124. For other examples, only some areas of the document will need to be allocated a pattern. For example, in FIG. 7C the document to be produced is a questionnaire 125, only the areas of the questionnaire 125 that are designated for a user of the questionnaire 125 to mark their reply need to be allocated a pattern 12.

The user defines the areas of the document to which the pattern 12 are to be applied. In this case this is carried out using a form design tool (FDT) 416 in the form of an Acrobat 5.0 plug-in.

At step 608 the user allocates computer-implemented functions to the various pattern areas, so that the pattern areas code for instructions to perform the functions. For example, a "send" function is designated by a user to the pattern area associated with the box 123. Different areas of pattern may be associated with different functions. At step 610 a name is given to the document.

Figure 7D:
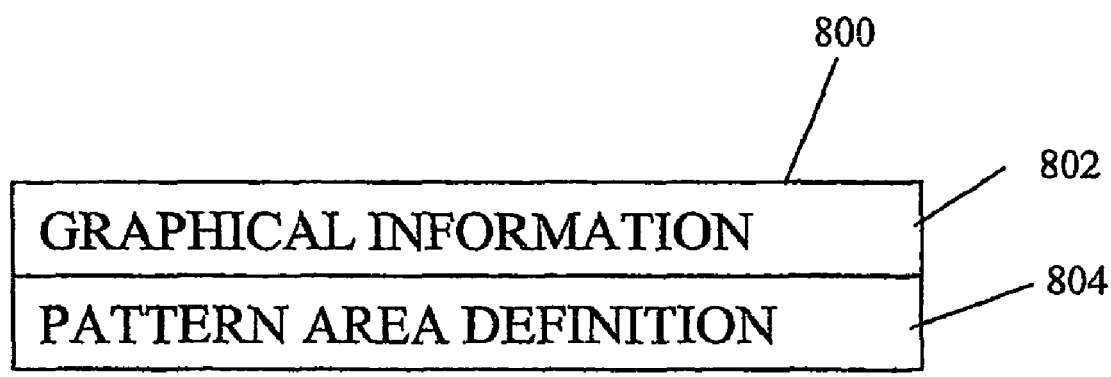
FIG. 7D shows a schematic illustration of a file defining the document illustrated in FIG. 7B.

FIG. 7D is a schematic illustration of an electronic file defining the document illustrated in FIG. 7A. When the electronic document has been completely designed, all of the information relating to it is stored as a PDF file 800 as shown in FIG. 7D. This PDF file contains graphical information 802 defining the content 121, 122, 123 of the document 120, and a pattern area definition 804 defining the sizes and positions of the pattern areas 12 on the document 120, and their associated functions, and also their relative positions (or identities) in an area of pattern space which will be allocated to the document. It contains all of the information required to build an association between the part of the pattern that will be printed and the region of the document where it will be printed.

Once the document has been designed, the user prints it out using the printer 112, 116, which comprise inkjet or laser printers (in this example). As previously mentioned, they may simply print-out a previously designed document from an available library of documents. The document is printed using a digital printer.

Figure 7E:
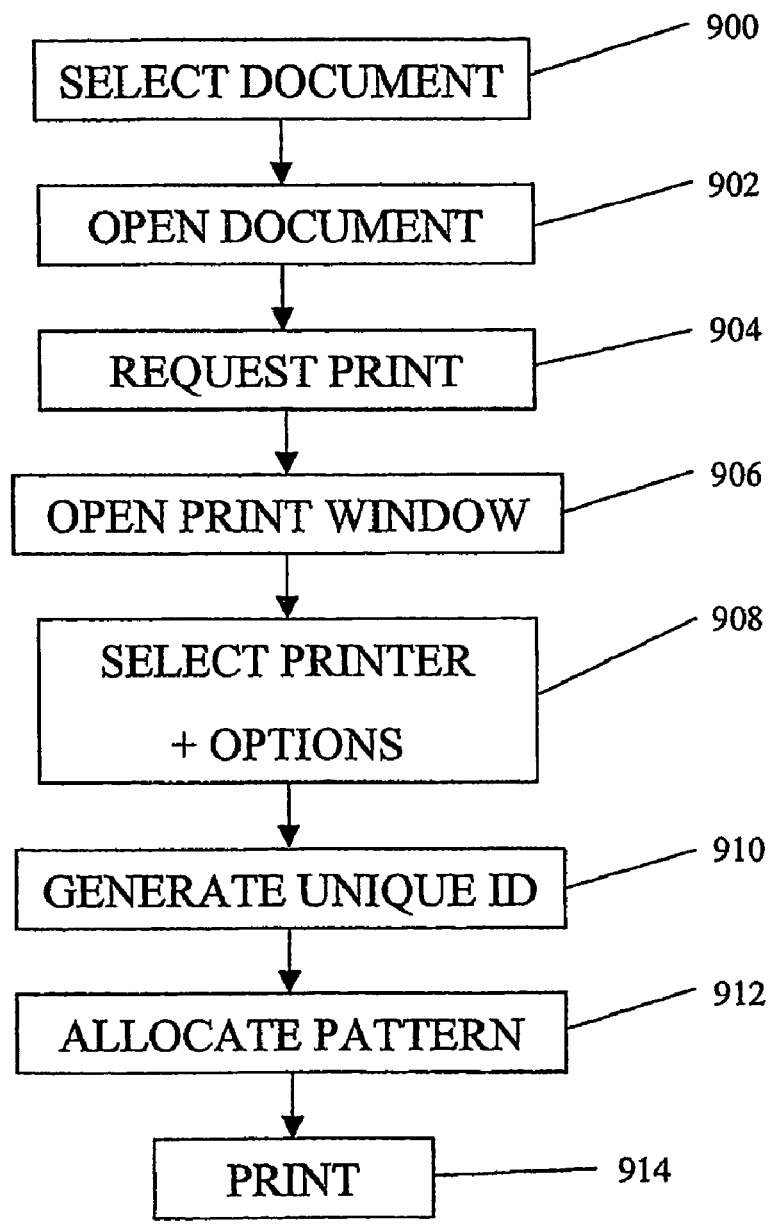
FIG. 7E is a flow diagram showing one possible process of preparing and sending a print job for the document illustrated in FIG. 7A.

FIG. 7E is a flow diagram showing the process of preparing and sending a print job for printing the document illustrated in FIG. 7A. First the user selects the document by its document name, at step 900 using a user interface, and opens the document at step 902 so that he can view it using the software application 102D. Then at step 904 the user selects a printing option to start the printing process. This causes a Print-on-Demand (PoD) tool, referenced as 102f in FIG. 5, to open a printing user interface (UI) (not shown) at step 906. Using the printing UI the user requests the number of prints and various other printing parameters (e.g. whether the printed document is to be in colour or black and white, etc.). The PoD tool 102f identifies from the document file name that the document is a document having a position identifying pattern on it and identifies those printers on the network which are capable of printing the pattern to a satisfactory quality. These might include 600 dpi, or high resolution (1200 dpi), ink-jet and laser jet printers. Other printers on the network which are not suitable for printing the pattern are not identified to the user as being available for them to print the particular document. A list of suitable printers capable of printing the particular document in question is displayed to the user, who can then select one of them for the print job at step 908. The user then also indicates the number of prints he wants to print. Then the user initiates the actual printing, inputting a print command via the printing UI. If a user wants to have multiple copies of a document with the same content those copies can have the same pattern on them, or different copies of the same content document can have different pattern on them. The user may be able to choose between these two possibilities, for example when sending a document to print, possibly using a GUI or dialog box.

When the actual print is initiated, the PoD tool 102*f* allocates a unique instance ID to the printed document at step 910. It then requests the required amount of pattern space from a database (stored for example in a pattern space allocation server), in this case one page, providing the document name and instance ID, and receives back from the pattern space allocation a definition of the pattern allocated to the required pattern space. This can be, for example, as a co-ordinate reference within the total pattern space (the computer being able to create the pattern from that information), or as a full definition of the actual pattern to be used, such as a bit map. The PoD tool 102*f* then divides up the pattern space in the required manner to locate a given piece of pattern in the areas of the document dedicated/allocated to receive pattern, at step 912 and adds information relating to where the pattern is to go in the document, and what region of pattern is to go where to the PDF file. The PDF file 600 then contains all the information required to print the document. The PDF file is then converted into a language that can be understood by the printer driver 110, 116, such as PCL5 or Postscript, and sent to the a printer driver 110, 116 (typically provided in the PC), from where it is sent to a print engine of the printer which controls the printing of the hard copy document.

The document is printed upon demand of the user, with the pattern and content being printed simultaneously. The content, printed in infra-red invisible ink, does not obscure the pattern from the pen, and so the pen can still determine the position even when pattern has text above or below it (superposed). It will be appreciated that when content is not over pattern, the problem of obscuring the pattern may not exist and we may have content printed using I.R. absorbing ink, provided that it does not obscure pattern that is intended to be read. Thus a document (e.g. a sheet of paper) may have some content in some regions, not overlying pattern, that is to be read in infra-red absorbing ink, and some content in regions that do overlie (superposed with) pattern, printed with ink that does not significantly absorb at the relevant infra-red wavelength.

An example of a printer that is suitable is a 600 dpi or 1200 dpi ink jet printer such as one that is available from Hewlett Packard Company (e.g. the HP DJ 10 PS). The invention will mainly be described in relation to the use of an ink jet printer but the invention may also employ a laser printer, an LEP printer or a printer that uses toner/photocopier technology, to name but a few examples.

Inkjet printing is a non-impact printing process in which droplets of ink are deposited on a print medium in a particular order to form alphanumeric characters, area-fills, and other patterns. Low cost and high quality of the hardcopy output, combined with relatively noise-free operation, has made inkjet printers a popular alternative to other types of printers used with computers.

A document, such as document 120, that is printed so that it can be used with a digital pen system (such as that described with reference to FIG. 2) has the pattern 12 printed with a first ink that absorbs light at a non-visible wavelength of light. The content 112 is printed using a second ink that is visible with the human eye but is not substantially absorptive at the non-visible wavelength. In this example all of the content 112 is printed with the second ink, but in other examples the pattern 12 does not extend over the whole of the sheet of paper and content on non-patterned areas is printed in the first ink, or at least some of it is. In another embodiment, even though there are unpatterned areas on the document that carry content, the content (or at least some of it) is still printed in non-absorbing ink.

The first ink may be ink that absorbs infra-red light. The first ink may be a pigment-based ink, for example an ink including carbon black as a pigment. There may be more than one first ink in the printer 110, 116 used to print the printed article, for example, there may be two or more second inks absorbing at different non-visible wavelengths, or they may absorb at the same non-visible wavelength. They may have the same or different colours at visible wavelengths.

The second ink or inks may be dyes, and may not be pigment-based. The second inks may be of different hues such as cyan C, magenta M, yellow Y, light cyan Lc, light magenta Lm and black K.

Figure 8:
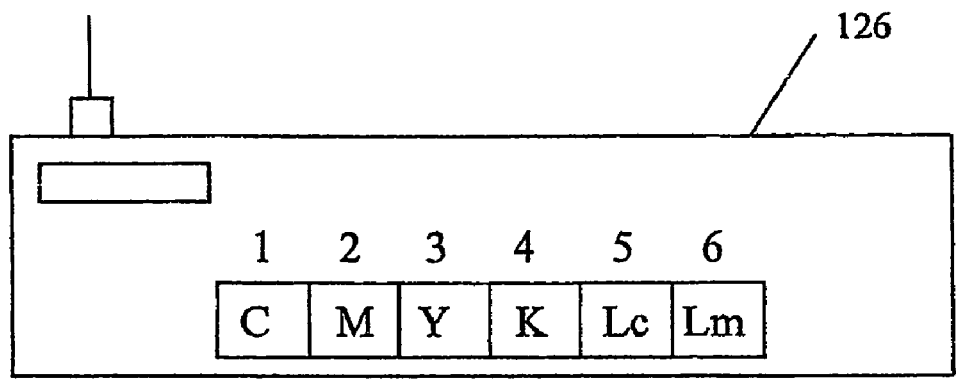
FIG. 8 shows schematically a six-channel printer.

FIG. 8 is a schematic view of a six-ink channel ink-jet printer. The channels have been arbitrarily numbered 1 to 6. An example of such a printer is the DJ 10 PS supplied by the Hewlett-Packard Company. Typically, the printer has CMYLcLmK (cyan, magenta, yellow, light cyan and light magenta and black) inks as an ink set. Most conventional C, M, Y, Lc and Lm inks do not absorb IR light, however, most conventional black inks do absorb IR light.

To print a document that has Anoto-type functionality one of the inks needs to be absorptive at the non-visible wavelength. The other inks should not absorb at the non-visible wavelength but should be visible (or more accurately, content that overlies or underlies pattern should not be printed with ink that absorbs at the non-visible wavelength—at least not where a user is intended to write on the pattern with a digital pen which is intended to capture the pattern).

Figure 9:
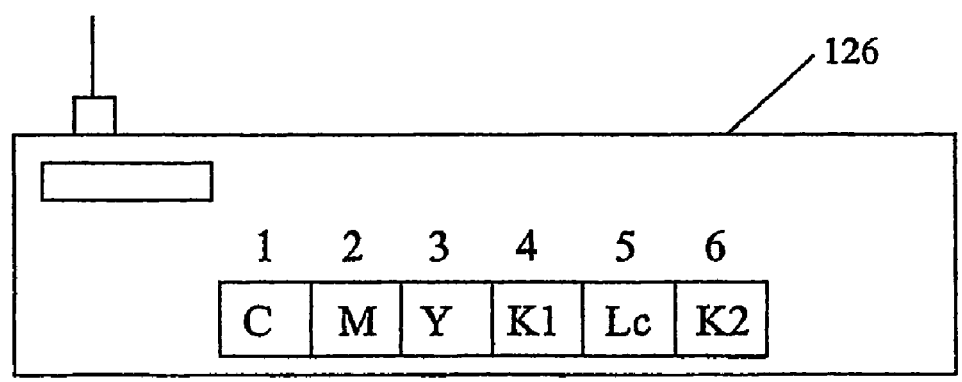
FIG. 9 shows schematically a modification of the six-channel printer of FIG. 8, modified to have an ink set for printing a document that has a machine-readable pattern and human-readable content.

FIG. 9 is a schematic view of the printer of FIG. 8 in which the black ink is Anoto substitute black ink K1 and the light magenta ink, (or in other examples both of Lc and Lm) has been replaced by black ink K2 for printing the pattern 12. The Anoto substitute black K1 is an ink that is visible to the human eye but has very low absorption at wavelengths between 800 nm and 950 nm. Therefore, the Anoto substitute black K1 can be used with the pattern 12 to print content 121, 122, 123 without disturbing the functionality of the pattern 12 (i.e. the pen 20 does not see the ink K1). In an alternative arrangement the Anoto substitute black K1 is not used and visible black is achieved on the printed document by using a combination of the C, Y and M inks. It will be noted that the Anoto substitute black ink has only been proposed for use by off-set printers by Anoto/the prior art.

The black ink K2 has high absorption at wavelengths between 800 nm and 950 nm. A suitable black ink K2 for printing the pattern is a pigmented black ink such as process black.

Figure 10:
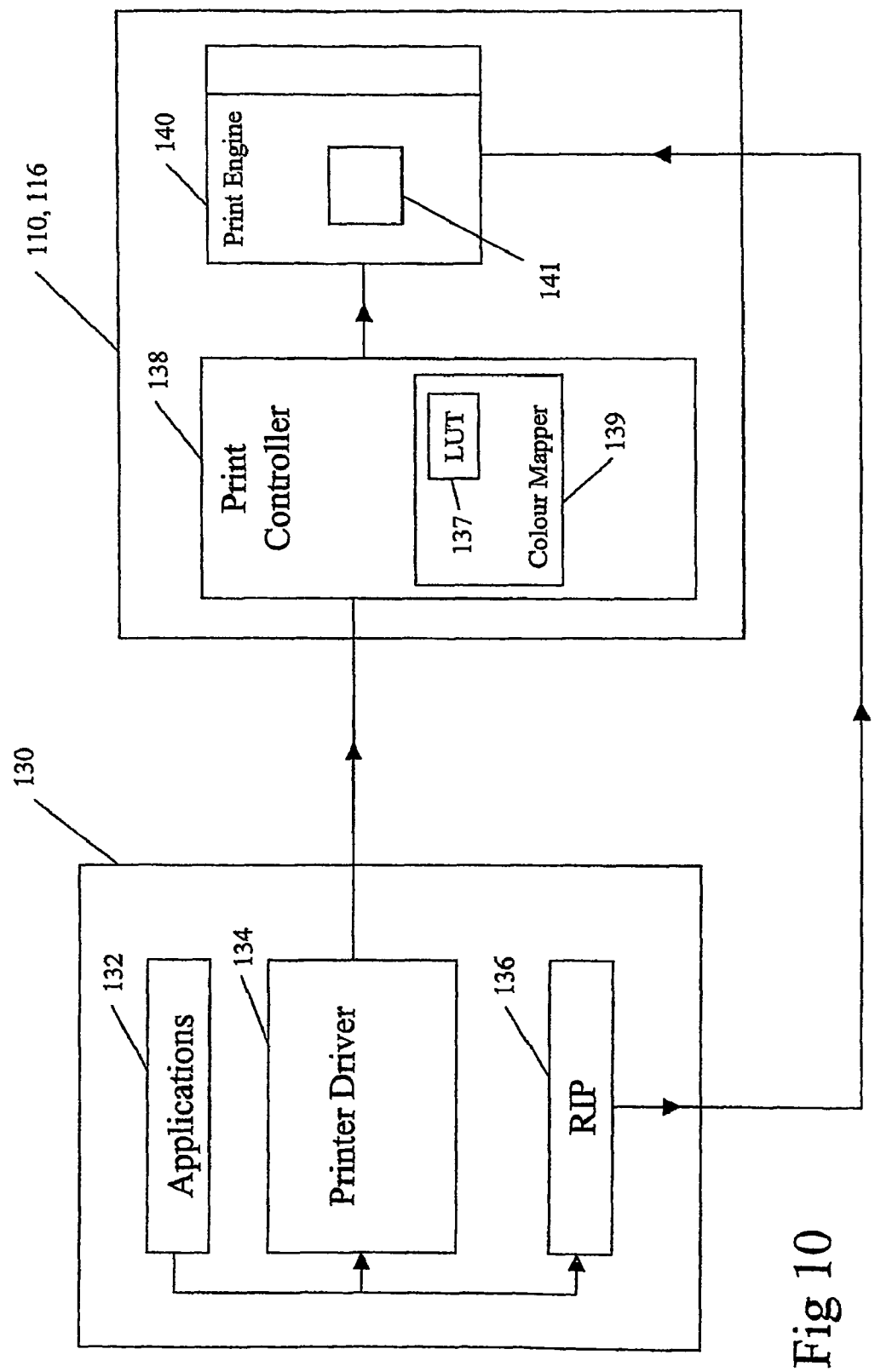
FIG. 10 is a schematic illustration showing in one embodiment the interaction between a host and a printer.

FIG. 10 is a block diagram of how a host 130, such as the processor of the PC 102, may interact with the printer 110, 116. The host contains application software 132 used to create a digital document and/or to retrieve it from a computer-accessible memory, and a printer driver 134 that allows the application software 132 to communicate with the printer 110, 116. The host 130 also contains a raster image processor (RIP) 136. The printer 110, 116 has a print controller 138 and a print engine 140. The print controller 138 has a raster image processor, memory and any general purpose microprocessors (not shown).

There are a number of ways in which the host 130 may interact with the printer 110, 116 to cause the printer 110, 116 to produce an Anoto-Lype functional document.

Figure 11:
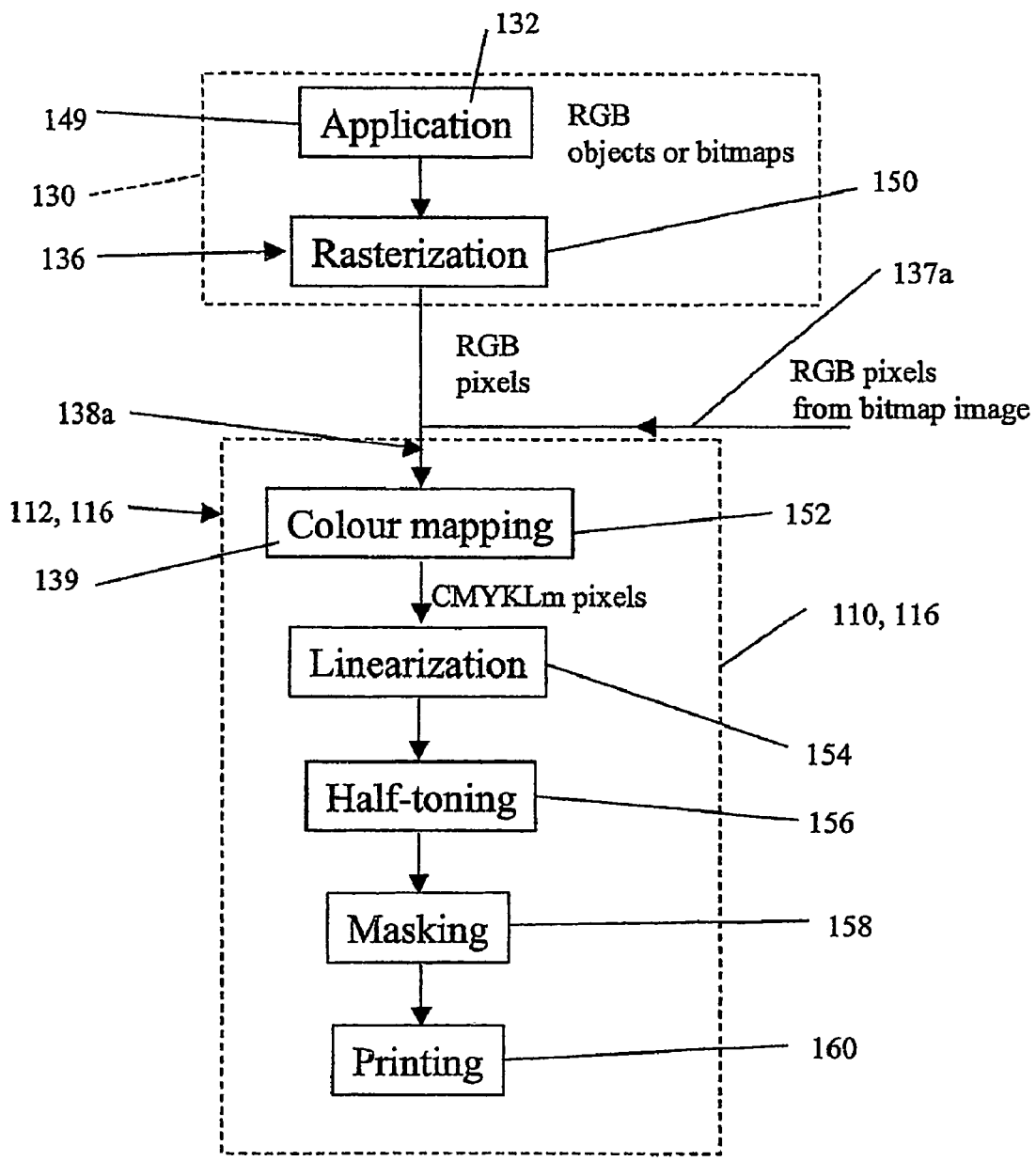
FIG. 11 is a flow diagram illustrating in one embodiment the processing carried out by the host and the printer according to a first exemplary method.
Figure 12:
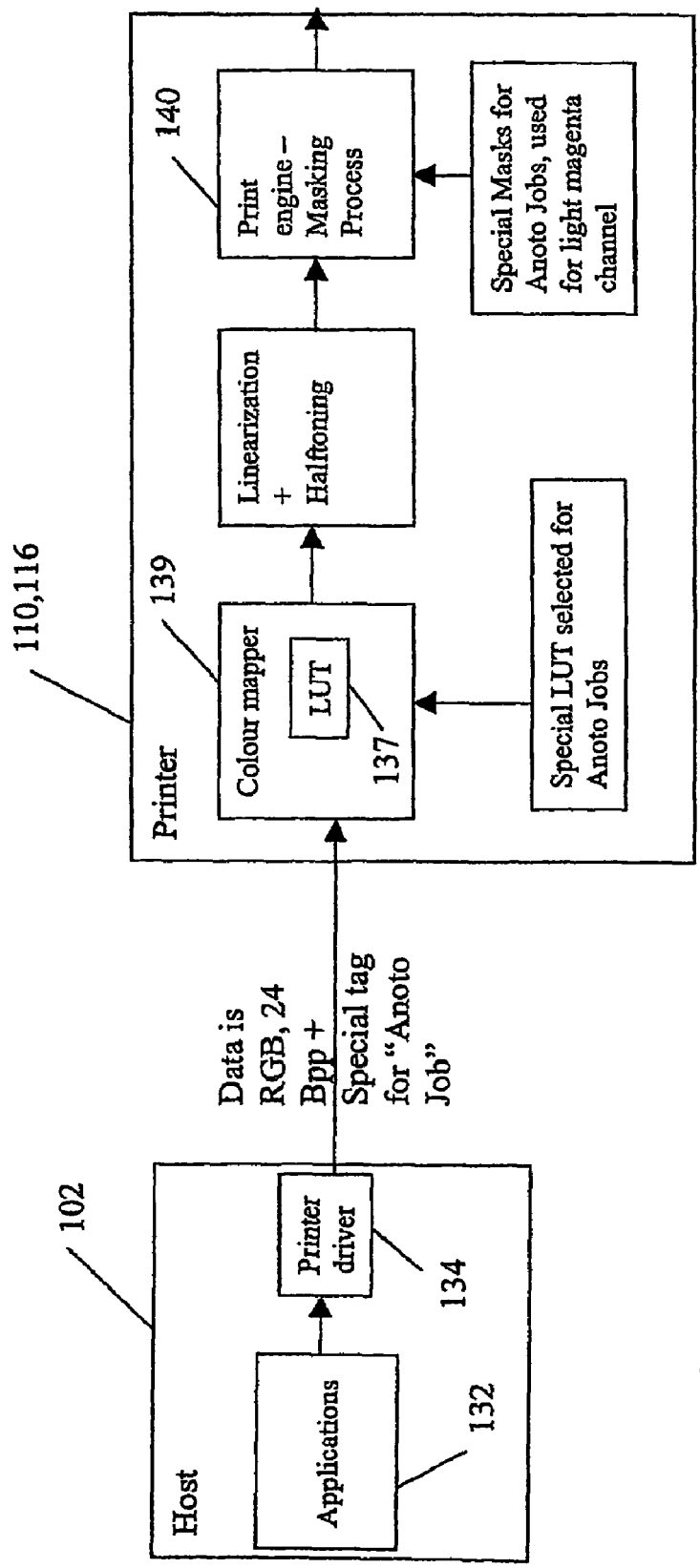
FIG. 12 is a schematic illustration of an example of an implementation of the first method used to produce a document that has an Anoto pattern and human readable content.

FIGS. 11 and 12 show a flow diagram and apparatus illustrating how processing is carried out by the host 130 and the printer 110, 116 according to a first method. The first method uses the printer driver to partition the pattern from the content and send pattern data and content data to different printer colour channels.

At step 149, the application 132 sends image data to the printer driver 136 of the host 130. Graphic image data (such as vectors, fonts) from the application 132 may be in the form of objects or in the form of a bitmap or a combination of objects and bitmaps. The image data at this point will usually be in Red Green Blue (RGB) format since the screen 108 of the workstation 101 will normally be of a type that displays an image using a combination of red, green and blue colours. In step 150, objects in the application 132 are rasterized by the RIP 136 of the host operating system 120 so that the objects are converted to rasters of pixels. The data generated by the rasterisation process are pixels in RGB format, with 256 levels possible for each colour channel in each pixel (this is sometimes expressed as RGB 24 bits/channel (8 bits per colour, 0-255 for R,G,B, for every pixel, with therefore 24 bits per pixel).

Image data that is already in bit map form does not need to be rasterized since it is already in a pixel format.

The RGB pixel data is sent to the print controller 138 of the printer 110, 116, shown as step 138a or 137a (depending if the pixel data is from the RIP or from a bitmap). The print controller 138 has a colour mapper 139. At step 152 the colour mapper 139 loads a Look Up Table (LUT) 137, provided from a memory in the printer (e.g. processor memory or hard disc in the printer). There are different LUTs for each type of paper, and for each print quality that the printer is designed to handle. The LUTs are loaded into the colour mapper 139 dynamically for each print job that the printer is asked to perform. The colour mapper 139 uses the LUT to convert a RGB value, for each pixel, to an ink combination (CMYKLcLm) (a combination of the inks the print controller expects to be available to the printer), the print controller not knowing that Lc is missing and Lm is actually K2. The conversion from RGB to CMKYLcLm is done by looking up the relative amount of ink of each colour in the table for each RGB colour, for each pixel of the image to be printed/document to be printed. The content of the LUT typically depends on the type of media (ink) to be used by the printer 110, 116 and the print quality required.

FIG. 11A shows an example of a Look Up Table (LUT) which is used for printing content (and no Anoto pattern) on a printer of the type illustrated in FIG. 8 with the ink cartridges/pens CYMKLcLm present. Each colour available to the printer is given an RGB value between 1 and 256, and has an associated value for each individual ink cartridge/pen to tell the printer how much ink to dispense to create the desired colour. The "K" is an infra-red absorbing black.

FIG. 11B shows an alternative LUT for use with the same printer as in FIG. 11A, but where the printer has been arranged to print content and an Anoto pattern. The printer cartridges are CYMK1K2 with the slot that previously held the Lm ink cartridge left empty. Now that the light magenta (Lm) and light cyan (Lc) ink cartridges have been removed, a different amount of cyan, magenta, yellow and black will need to be "mixed" to create the desired colour for the content. These amended values are stored in the LUT where $G_1$ is different to $A_1$, $H_1$ is different to $B_1$, $I_1$ is different to $C_1$ etc. and the same is true for each individual desired colour. K1 and K2 are two different black inks: one absorbing at the I.R. wavelength and the other not.

Alternative LUT's may be available when a different ink cartridge is removed to accommodate the infra-red absorbent black ink. These LUT's will contain different values again for how much ink needs to be dispensed from each individual cartridge to produce the desired colour.

In this embodiment each ink colour is allocated a separate colour channel in the processing of pixel data. For a printer with four different inks, there will be four colour channels. For a printer with six inks, there with be six colour channels. Each pixel on a page can have, for any single colour channel/colour ink: no ink of that colour applied, or some ink of that colour. The "some ink" can be one drop of ink, or two, or perhaps more: different levels of ink. A single pixel on a printed page may have ink from more than one colour channels printed on it, blending the inks to create a new, secondary, colour.

At step 154 the data is linearised so that each channel has only one dimension. Linearisation is a unidimensional operation in which an incoming input value of a channel is converted into another value. For example, in some embodiments linearisation is used to compensate for the fact that human-perceived changes in colour are not linear in comparison with actual changes in ink composition, and so in order to achieve a perceptually linear colour change, it may be desirable to have a non-linear "linearisation" curve to convert incoming input values to other values. Other printers may use a linearisation process to achieve other effects.

Then at step 156 the data is half-toned.

Half-toning consists of grouping a number of adjacent pixel locations together to form a cell that the human eye processes to be the desired colour. It is concerned with defining the spatial location where dots of inks should land on the paper in order to print the document. By carefully combining cells containing different proportions of CMYK (or CMYKLcLm) dots, a half-toning printer can "fool" the human eye into seeing a palette of millions of colours rather than just a few. Each pixel comprises a number of drops of the desired colour in order to create the desired colour intensity, alternatively, one pixel can consist of a number of drops of different colours to create the desired combination colour.

When printing the Anoto pattern, no half-toning is required as there is only one type of ink cartridge/colour used to print the pattern. Also, the intensity of the colour will always be consistent throughout the whole document.

Following the linearisation 154 and half-toning 156 steps each pixel has 6 colour channels (CMKYLmLc) with 2 bits (4 possible different levels) for each channel.

At step 158 the print engine processor 141 performs masking on the data and assigns a number of ink drops for each pixel. The number of ink drops corresponding to the level indicated by the 2 bit value associated with the pixel.

A masking operation defines the order in which dots of ink will be fired by the printer, and the number of dots fired at a particular pixel. For optimised quality printing inkjet printers may use multi-pass printing (print nozzles pass several times over each pixel location on the paper) and the masking operation determines which ink nozzle will fire ink when it is over a particular pixel, and in which of a plurality of passes it will do so. For example, the masking operation may be a logical operation, performed by a mask (for example stored in printer memory) and the data that is to be printed (pattern and content). This logical operation is typically an AND (if data has to be fired in a specific pixel for a specific colour AND mask for a specific pass if that pixel is TRUE a dot of ink of that colour is fired at that pixel in that pass. By way of example, if the half-toning operation says that three drops of ink have to be put into a specific pixel, and the printer has a six-pass print mode in which it is possible to put one dot in each pixel for each pass, a decision could be made to put dots of ink into the pixel in passes one, two and three, and not four, five and six.

The mask for this sequence would be pass 1: TRUE, pass 2: TRUE, pass 3: TRUE, pass 4: FALSE, pass 5: FALSE, pass 6: FALSE.

At step 160 the document is printed by propelling the ink drops at the print medium (e.g. a paper sheet).

To summarize, steps 149 and 150 take place in the host 130 (such as the PC 102) and steps 152, 154, 156, 158 and 160 occur in the printer 110, 112.

Referring now to FIG. 12, and concentrating on the structure present, in this implementation a six-colour channel inkjet printer, specifically the HP DJ 10 PS in one embodiment, has as black ink K the dye based black ink K1 that does not absorb significantly in infra-red (e.g. Anoto substitute black ink). The black ink K1 is used, along with the CYM inks, to print the content of the document in the normal way. The light magenta pen (Lm) in the fifth ink channel is replaced by process black ink Y2 that does absorb at an infra-red wavelength seen by the Logitech IO pen. A printer with this arrangement is illustrated in FIG. 9. When printing an image with both pattern and content, the pattern data is provided separated into a separate colour plane (if a page of printing is considered a plane of pixels, the end colour of pixels of the page can be considered to be the sum of separate colour planes of printing, limited to printing just one ink in each plane: a four-colour channel printer having data in four-colour planes, a six-colour channel printer having data in six colour planes, etc.).

Figure 18:
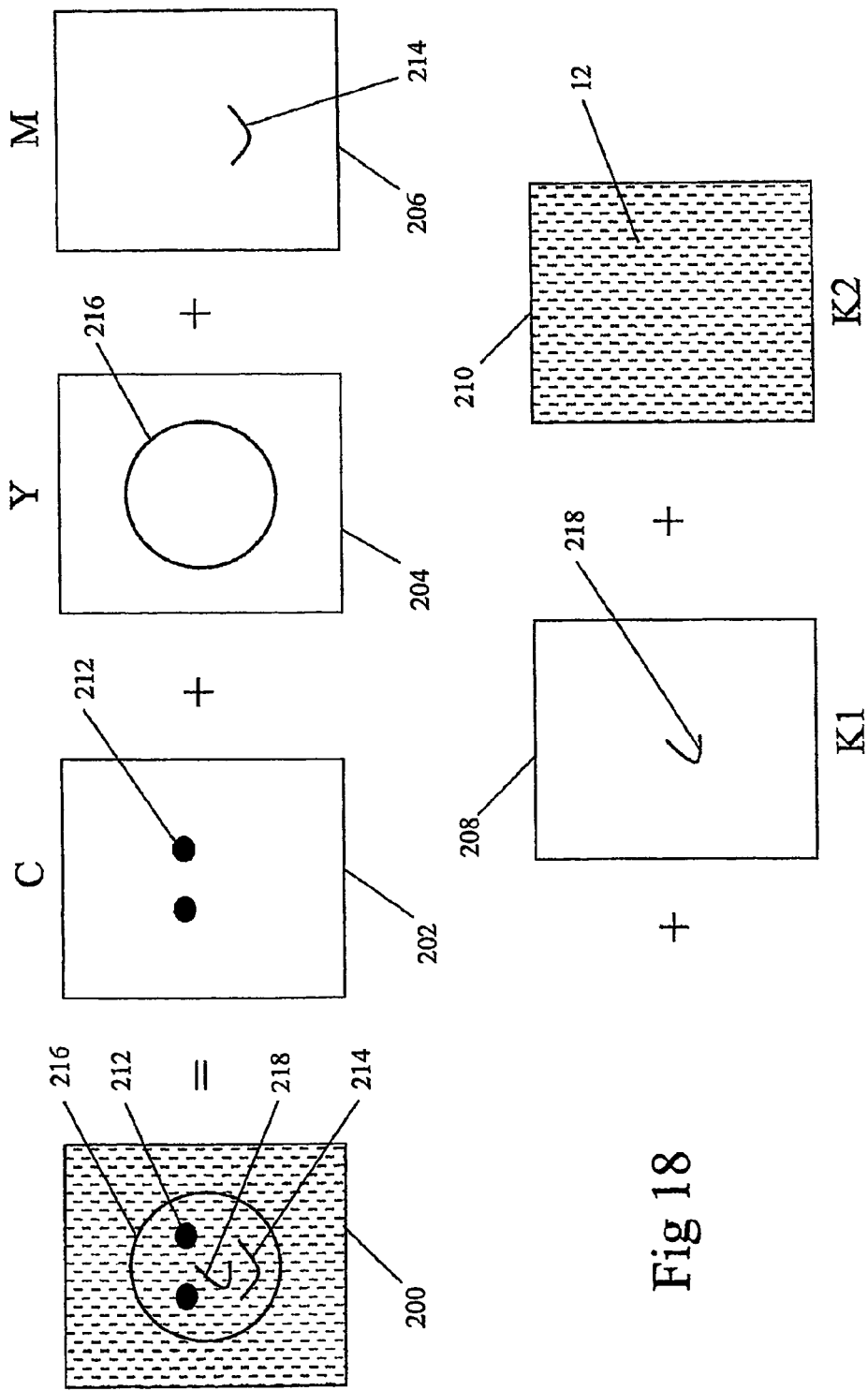
FIG. 18 shows how an embodiment of a document containing human discernable content and a machine readable pattern is made up of a plurality of colour panes.

FIG. 18 illustrates this in more detail. It shows schematically how a picture 200 can be split into four colour planes 202, 204, 206, 208 for the content 212, 214 216, 218 of the picture and one colour plane 210 for the pattern 12 when using a printer 126 as illustrated in FIG. 9 where the light cyan (Lc) channel has been left empty. The desired result 200 is the sum of the individual planes 202, 204, 206, 208, 210, each plane being allocated a colour channel in the printer 126.

The picture is of a sun with a smiley face. The eyes 212 being cyan-coloured and present on the cyan plane 202, the sun 216 on the yellow plane 204, the mouth 214 on the magenta plane 206, the nose 218 on the black K1 plane 208 and the Anoto pattern on the infra-red absorbent black K2/light magenta plane 210. When all of these planes are printed by their respective printer channels, they will create the desired final picture on a sheet of Anoto digital paper.

Thus, when printing a document, the pattern is isolated into a single colour plane, the plane for Lm/K2, and that data/colour plane is sent to the fifth channel in the same way as other graphical data is sent, that is the pattern data is processed in the same way as the content data (in this example). The light magenta channel having the process black ink K2 is then used exclusively to print the pattern 12. The sixth channel may have light cyan (Lc) pen or it may be empty, or it may have a spot colour, or it may have a second channel of one of the other colours (i.e. two channels may have the same ink).

It will be appreciated that any one of the different inks can be designated to any one of the different colour channels; all that is necessary is that the LUT has the ink designation information.

It will also be appreciated that, in another embodiment, if the document has content disposed away from an area of dot pattern, then that "non-pattern superposed" content (or at least some of it) could be printed in K2, the I.R. absorbing black ink. If this was done in the same printing operation as printing the pattern, the "non-superposed" content and the pattern could be in the same, K2, colour plane.

Figure 12A:
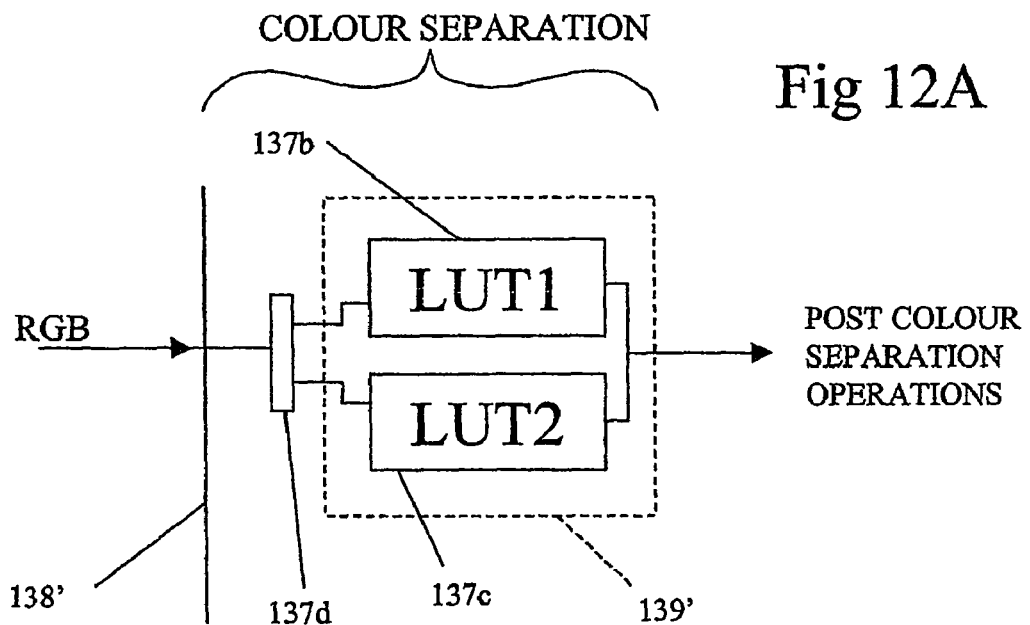
FIG. 12A shows a printer colour mapper having two LUTs.

It is appropriate to discuss a point of interest here. Conventionally, different colours are printed on a document by using the primary colours CMYK and blending them at specific pixels to produce a myriad of different colours. That is to say, many, many, colours have at least some ink of a specific primary colour ink of the ink set. Thus, if the black ink K is infra-red absorbing, many, many, colours that incorporate some K will also be infra-red absorbing. Simply not using K in the composition of a particular composite colour is not so easy. The LUT used to perform a colour separation operation from RGB to ink colour planes is conventionally configured to use K in the "mixes" of ink to equate to RGB values. To leave out K in a combination, secondary, colour requires a re-writing of the LUT to compensate for not having K ink by having different proportions of CMY. One possibility is to have a printer permanently configured for printing document with pattern and content. This would have an LUT as discussed above, with modified colour combination values to take into account the fact that no K would be used. More likely is for the printer to have one LUT for use when K, normal black ink is used along with Lc and Lm, and another, different LUT to be used when the content will have CMY and K1, but no Lm and no Lc. This is schematically shown in FIG. 12A and is discussed later.

In the case of a four-colour printer, where the only black was K2, infra-red absorbing black, all other colours (thousands of colours) would be made using CMY only, and the LUT would be configured that way.

In the case of a multi-channel printer having two blacks, K1 and K2, and CMY, content colour would be printed using CMYK1, but not K2. If K1 has different colour properties than normal black ink (e.g. different optical density, different typical absorption in paper, etc.) than the LUT may have different levels of K1 in blends of inks to achieve specified final colours than if a different black, ink were used.

In a further embodiment there may be a first LUT for use for areas of the document that use K1, the I.R. non-absorbing black, and a second LUT for areas of a document that use K2, the I.R. absorbing ink (e.g. areas away from pattern). Different LUT's could be used for printing different areas of the same document with colours (depending upon whether K1 or K2 is desired to be used in a particular area of the document—whether that area is pattern superposed or not), just as different LUT's can be used for different documents/pages, depending upon whether they have pattern on them or not. The two LUT's could be the same LUT's in both scenarios.

So far we have described a printer dedicated to, or for, printing documents with both pattern and content.

However, a user may have many occasions when they wish to print document with no pattern: no machine-readable material—only human-discernable content. Or regions of a page which have no pattern, or which have pattern but it is not important that a digital pen be able to read a particular area of pattern.

Printers can, of course, do this simply by printing in CMY, and K1 if it is provided.

But, printing black in CMY, or even dark colours in CMY alone, with no black in the mix, is not as good as printing using black. Black which absorbs in the infra-red wavelengths often has better opacity than non-infra-red-absorbing black ink and may be preferred for that reason.

Also, K1 may be more expensive than K2.

We have appreciated that it is desirable to be able to print using K2 (black ink that is infra-red absorbent) in the content if no pattern is printed on the particular page, or document, or indeed if no pattern is printed, or is printed but it is not desired to read it, in certain areas of a page.

In order to achieve this, we have a first LUT to be used to translate RGB values to colour separation when pattern is to be printed as well as content, that LUT directing the use of no K2 in the content colours, and a second, different LUT, to be used to translate RGB values to colour separation when no pattern is to be printed, the second LUT directing the use of K2 in the content colours. In this way, so long as we know which LUT to use, we can switch a printer from a first mode in which it prints content using a restricted group of inks from the inks available in the printer to a second mode in which it prints content using an ink that is disallowed for content in the first mode. Thus, for the sake of example, if K2 has better opacity than K1, we can print content using K2 as part of the colour mix when only content is wanted on a particular page, or in a particular area of a page, and switch to printing content with K1 when pattern is also wanted, pattern being printed with K2 (either switch to K1 for content for the whole page when it has content, or for at least certain regions of the page).

As another example in one four-colour channel printer with CMYK2 used in accordance with the invention we can print content with CMYK2 when pattern is not wanted. When pattern is wanted, the pattern is printed with K2 and the content is printed using CMY exclusively (no K2 for content). This can be achieved by having two different LUTs, and using the appropriate one for a print operation. Similarly, we can print content at different places on the same page using CMY only (no K2), for areas where we want to read pattern printed in K2, and in CMYK2 for areas on the page where we do not want to read a pattern (whether because these areas have no pattern printed on them, or because we do not care about reading that part of the pattern).

The electronic version of a document to be printed, e.g. a file containing it, may have an indication/flag which automatically triggers the use of the "pattern-appropriate" LUT when a document containing pattern is printed.

Any particular colour, say Pantone WXYZ, may have different amounts of C, and M, and Y, used to construct it depending upon which black, if any, is being used as well.

Also, as an example, in a six-colour channel printer we may have the same printer able to print a document having both content and pattern using K2 for the pattern and CMYK1 for the content, and also able to print the content of documents not having pattern (or areas of a document not having pattern) using some K2 either instead of, or in addition to, K1.

It is known to have printers automatically use CMY to produce black if the black pen/ink runs out. We can have a printer, set to print a document having no pattern (or areas of a document, for example having no pattern), use ink K2 if it is available and K1 if K2 has run out/is not available. Further, or alternatively, we can use CMY to produce black if K2 runs out/is not available (possibly using K1 as an alternative and if that is not available (or is in low supply) instead of the CMY mix to create black). For example, if in an area of a document with no pattern it was desired to print content using CMY (no K2) for the whole document, we could, if the printer knew that the supply of one of C, M, or Y, was running low, print content using K2 after all, at least in areas where we do not care about reading K2 pattern.

A specific implementation is now described with reference to FIG. 12A. The print controller 138' has a colour mapper 139' having both a conventional LUT, LUT1, referenced 137b and also a pattern colour separation LUT, LUT2, referenced 139c. In this case, the user selects in the user interface of the printer driver 134 (in the host 130) his intention to print the current document with a pattern 12. He may do this using a dialog box. The printer driver 134 then adds a special command (i.e., a tag) in the print file so that the printer 110, 116 will be instructed to pass into "Anoto", or pattern plus content, mode. The driver 134 still sends RGB data, with 24 bits per pixel to the printer. The tag identifying the document to be printed as having pattern causes a LUT selector 137d to select LUT2 for use, the LUT2 reproduces the input RGB colours for content with the four inks CMYK1 (not using K2). The LUT2 also sets the light magenta (Lm) channel, containing the process black ink K2, to a value of 255. This channel is reserved for printing pattern only.

In an alternative embodiment, the printer, printer driver, or "something" notices that a document to be printed will have pattern and uses that information to control the choice of LUT to be used for the document or for specific areas of the document.

Figure 12B:
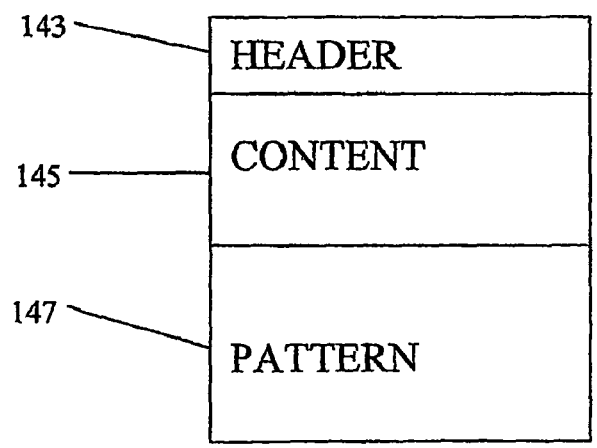
FIG. 12B shows a schematic illustration of a file defining a document to be used with the colour mapper of FIG. 12A.

FIG. 12B is a schematic illustration of an electronic document to be used with the colour separation unit of FIG. 12A. The document consists of human-discernable content 145 in a first notional electronic section (possibly a file), a machine-readable pattern 147 in a second notional electronic section (possibly a file) and an associated header 143. The header 143 contains a flag which is set for a document that contains a machine-readable pattern to be printed. The LUT selector 137d of FIG. 12A uses this flag to determine which LUT to use, and selects the correct colour values to be used with the plurality of colour channels.

The CMYK1 channels, for content data, are processed normally (linearisation 154, half-toning 156 and masking 158). The light magenta channel is also linearised and half-toned, but since every pixel of this channel has a value of 255 the output of the half-toning 156 will always be "TRUE". The masking process 158 for the light magenta channel, therefore, will be a simple AND operation between the pixel value (TRUE) and the masks. The firmware of the print engine 140 re-computes the masks for the masking process 158 so that the light magenta channel (which actually contains the pigmented black ink K2) reproduces the pattern 12. The above relies upon the pattern data being separable into its own colour plane. In other examples, the pattern and black content (or a black component to content) that is away from pattern is separated into a K2 colour plane.

Figure 13:
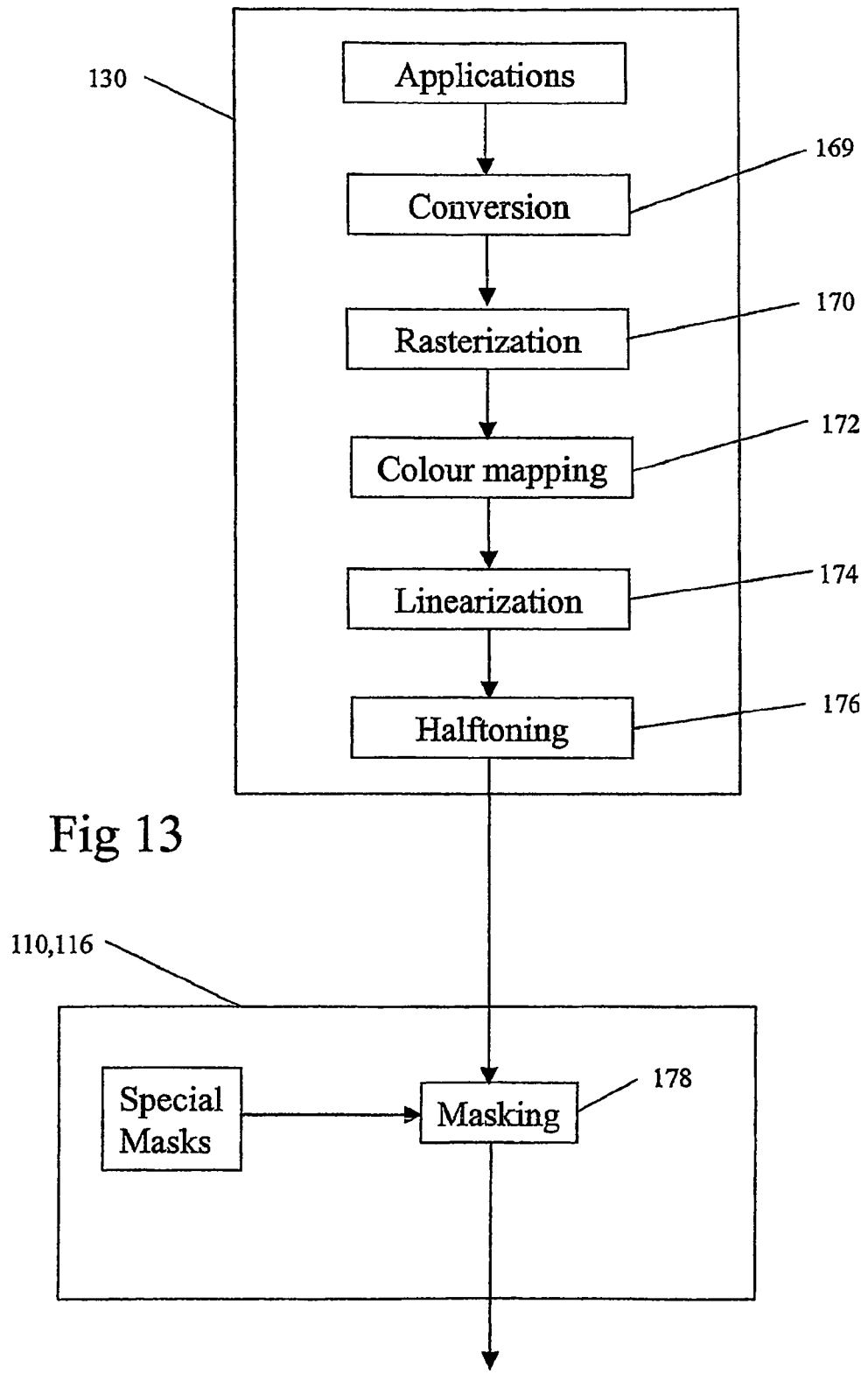
FIG. 13 is a flow diagram illustrating one example of the processing carried out by the host and the printer according to a second method embodiment.
Figure 14:
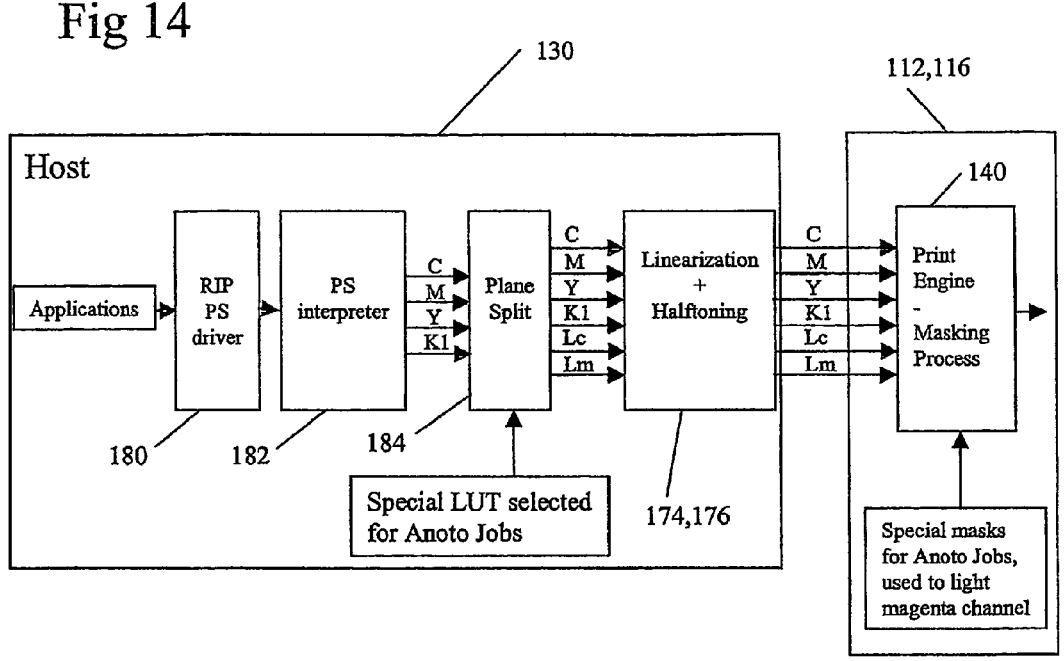
FIG. 14 is a schematic illustration of a first implementation embodiment of the second method.

FIGS. 13 and 14 illustrate how processing is carried out by the host 130 and the printer 110, 116 according to a second method. This time more data processing is done in the RIP.

In step 169 objects in applications are converted to Postscript language in the host 130. In step 170, the Postscript data is rasterized by a Postscript interpreter 182. The Postscript interpreter 182 is a piece of software that runs in the RIP 136 of the host. In step 172, a LUT is used for colour mapping. During colour mapping 172, each pixel is given six colour channels (CMKYLcLm) each of which has a value for each pixel in the range 0-255 for each pixel. The linearisation 174 and half-toning steps 176 are similar to the linearisation 154 and half-toning steps 156 performed in the first method except that the steps in the second method are performed in the host 130 rather than in the printer 110, 116. Following the linearisation 174 and half-toning 176 steps each pixel has 6 colour channels (CMKYLmLc) and 2 bits (4 possible different levels) for each channel. This data is then sent to the printer 110, 116.

At step 178 the print engine processor 141 performs masking on the data and then assigns a number of ink drops for each pixel. The number of ink drops corresponds to the level indicated by the 2 bit value associated with the pixel (e.g. if the bits can be 00, 01, 10, 11, then these can code for no drops of ink of that colour at that pixel, 1 drop, 2 drops, or 3 drops).

Figure 14A:
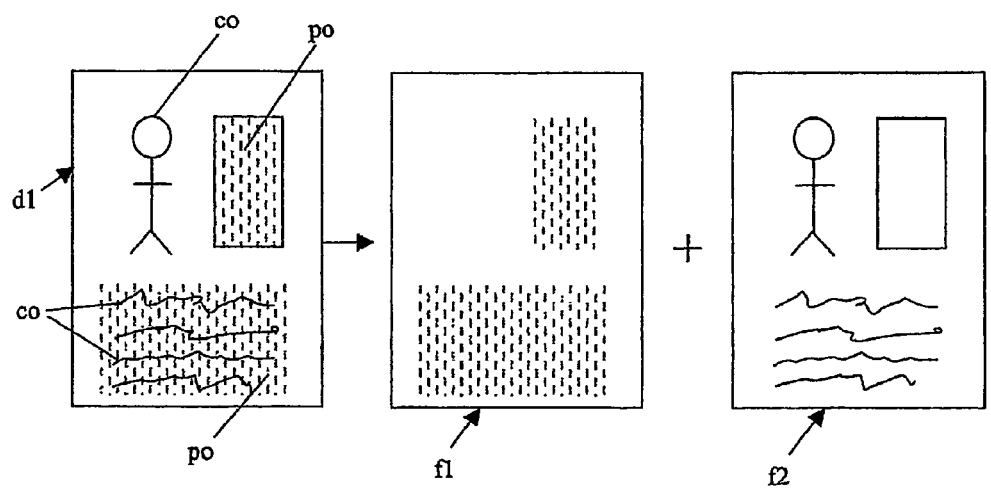
FIG. 14A schematically illustrates one embodiment of a document printed with machine-readable pattern and human-discernable content.

FIG. 14 is a schematic illustration of a first implementation of the second method that causes the printer to produce an Anoto-type functional document. It generates the Anoto-type pattern in the masking process. The K channel in the six-colour channel printer 112, 116 has the dye based substitute black ink K1 and the light magenta channel Lm has pigment based black dye K2. The document to be printed is schematically illustrated in FIG. 14a and comprises pattern objects po, and content objects, co, held in a memory. FIG. 14a shows a document d1 notionally split into a pattern file, f1, and a content file, f2. The Postscript driver 180 and Postscript interpreter 182 convert the content objects co in applications to pixels in CMYK1 format. Then, a specific LUT for Anoto (pattern and content) printing is loaded in the colour plane separation unit 184 (e.g. LUT2). This may be in response to user-input command, or in response to an automatic detection of pattern to be printed. The appropriate LUT is referenced from memory and loaded into the processor used for colour plane separation. This LUT, LUT2, reproduces the input CYMK values as an output that uses CMYK1, and not K2, ink. The LUT2 also forces the "light magenta" channel to a value of 255 for any CMYK1 input combination, the light magenta channel actually having K2, infra-red absorbing black ink. The light cyan channel is set to zero for any CMKY input.

The CMYK1 channels are normally processed (linearisation 174, half-toning 176 and masking 178). The light magenta channel Lm is also linearised 174 and half-toned 176, but since every pixel present on this channel has a value of 255, the output of the half-toning step 176 will always be "TRUE".

In the printer 112, 116 the print engine processor 140 re-computes the masks for the light magenta Lm channel (which contains the pigmented black ink K2) so that the light magenta channel reproduces the pattern 12.

The masking process for the Lm channel is a simple AND operation between the pixel value (TRUE) and the masks.

In the masking process the print engine 140 applies a mask to each colour channel to turn each pixel for that colour ink, at the determined amount of ink, either "on" or "off"—i.e. mask out pixels that are not to be printed using that specific colour ink. For the Lm channel (K2 channel), the mask applied by the print engine is driven by the pattern data: it is the mask process that determines where machine-readable infra-red absorbing ink will be applied to a pixel to form machine-readable position-determining dots/pattern.

Figure 14B:
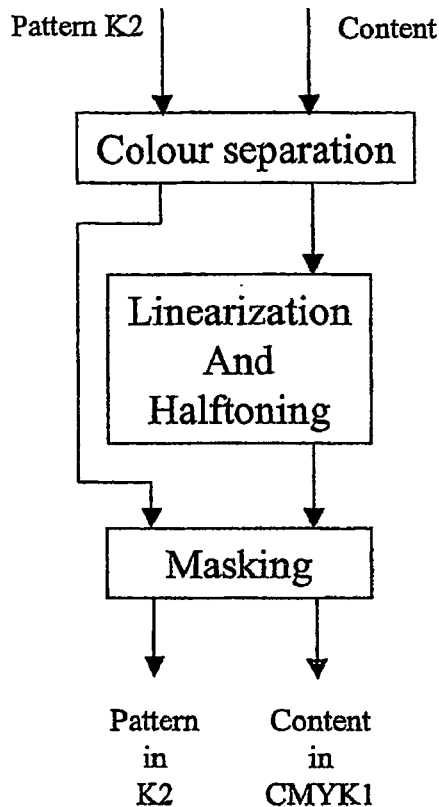
FIGS. 14B and 14C show variations of the embodiment of FIG. 14A.

FIG. 14b schematically illustrates a variant embodiment in which instead of having Lm (K2) data go through linearisation and half-toning, the Lm data after colour separation by-passes linearisation and half-toning and goes directly to masking, as for a regular print operation. This will reduce computational load and is based on a realisation that linearisation and half-toning are unnecessary for pattern data: the pixel for pattern is either full on or off, with no shades in-between. It may be difficult or impossible to do this if the K2 colour plane contains any content: it may be necessary to have pattern only in its own colour plane in order to avoid half toning and/or linearisation.

Figure 14C:
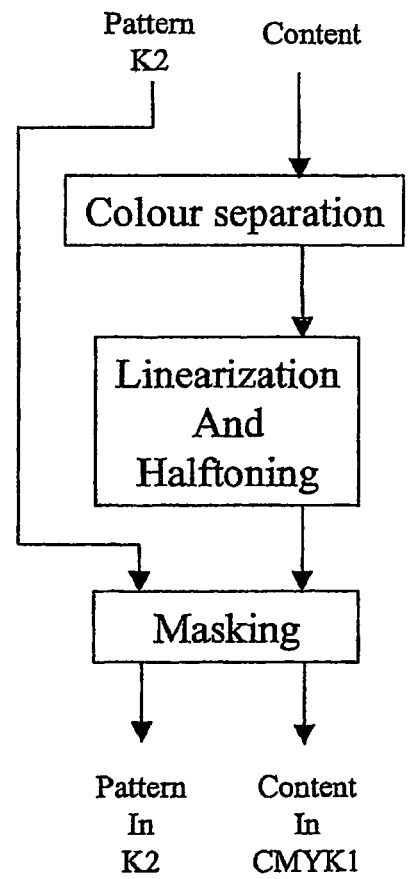

Also, in a further variant embodiment, if the pattern data is provided already separate/separable from content data, then pattern data may be able to by-pass colour separation, as well as by-passing linearisation and half-toning. This is shown in FIG. 14c.

Figure 15A:
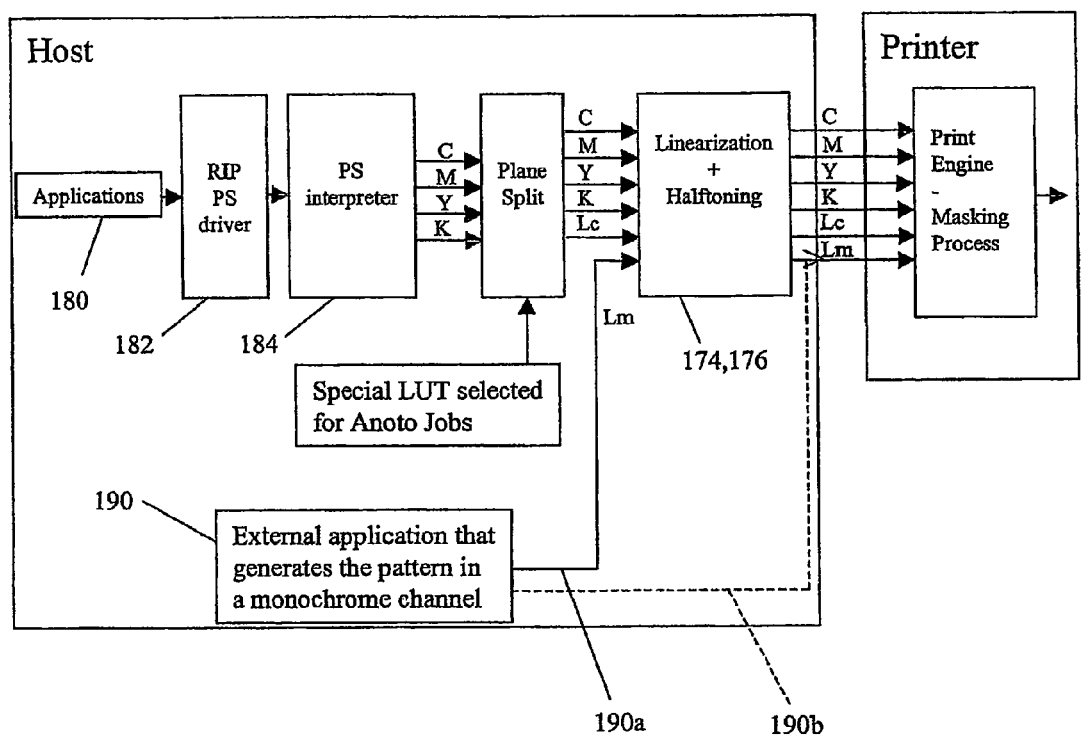
FIG. 15A is a schematic illustration of a second embodiment of an implementation of the second method embodiment.

FIG. 15A is a schematic illustration of a second implementation of the second method for printing an Anoto-type (pattern and content) functional document. In this implementation the pattern is generated externally of the host and printer and provided to the host computer as a monochrome channel. The processing for the channels CMYK1 (that are used to print the content of the document) is the same as the previous implementation. However, the special LUT, LUT2, used in this case sets both light cyan and light magenta output values to 0 for any incoming colour combination.

In this second implementation, the way the pattern 12 is produced is that an external application 190 generates the pattern 12 and merges it to the print job, in the light magenta channel (that was empty—all values previously set to zero).

This merge could occur before half-toning 176 (with values for each channels from 0-255) shown as 190a in FIG. 15, or after half-toning (with values from 0-4), shown as 190b in FIG. 15. Light cyan is still set to zero (because there is no light cyan pen/ink cartridge in the printer).

The masking step 178 is similar to what it would have been for a regular print job. No special masks are required for the light magenta channel in this implementation.

Figure 15B:
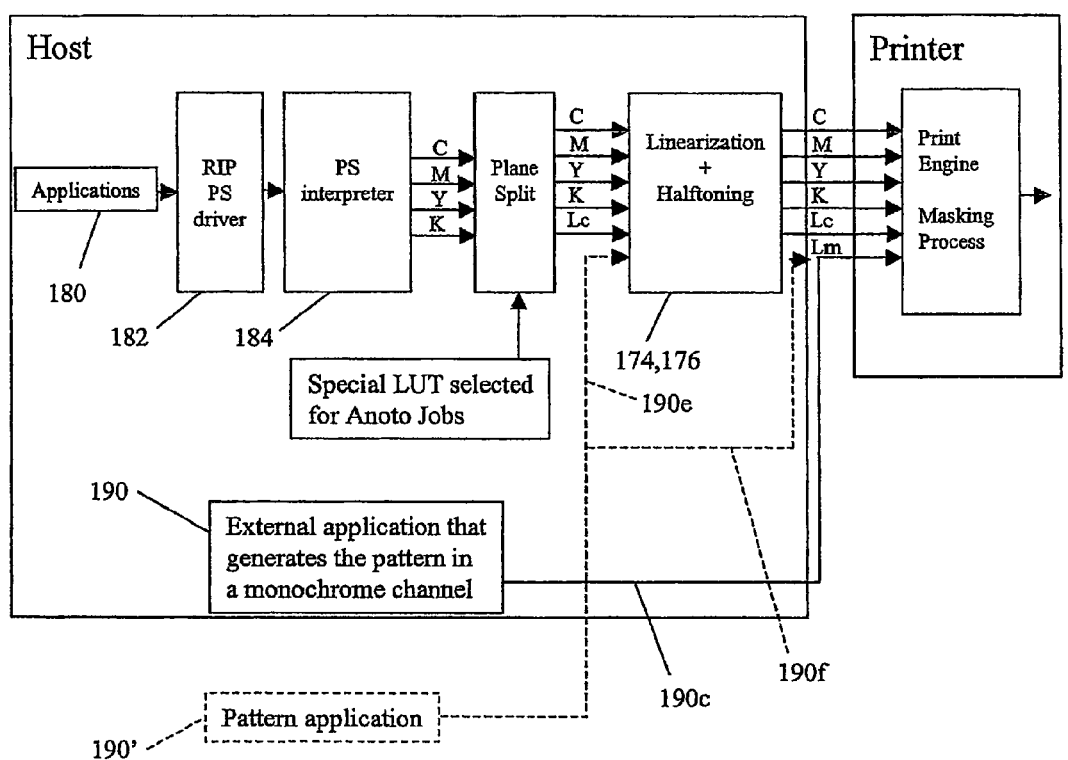

FIG. 15B shows another variant where the external application that generates the pattern sends the pattern directly to the printer for merging with the content. This is referenced as 190c. The pattern data is used in the Lm colour channel of the printer, and the content printed using the other channels (but not Lc if it has no ink in it). The Lc channel can be used in colour separation if there is Lc in it/a colour in it.

In a further embodiment, also schematically shown in FIG. 15B, the application 190' does not reside on the host computer, but rather elsewhere, the pattern data being sent either to the host computer (190e and 190f), or to the printer, (190c), or to both (e.g. in case the host needs a record of the pattern).

The invention so far has been specifically described with reference to a six channel ink-jet printer. The skilled person following the teachings of the statements of invention, will be able to perform aspects and embodiments of the invention using, for example, colour printers with other numbers of colour channels, e.g. printers with four channels, colour printers with seven, eight or more channels (such as LEP printers). The invention can also be performed with monotone printers and toner-based printers.

Figure 16:
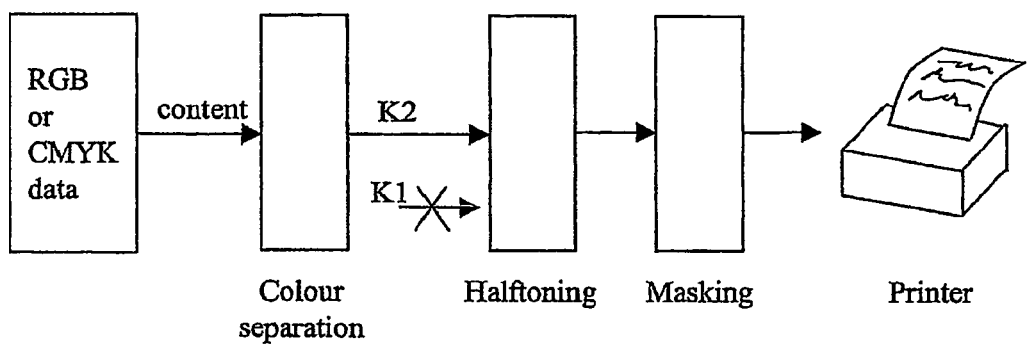
FIGS. 16 and 17 are schematic representations of embodiments of printer control systems and associated ink sets.

FIG. 16 shows schematically a printer having two different black inks, K1, which is non-absorbing at infra-red, and K2, which is absorbing. K2 is preferred for printing content, but not when machine-readable pattern is to be printed, in which case K2 is reserved for pattern and K1 is used to print content. Appropriate LUTs are provided: one for when the printing is to include pattern, and a different one for when the job to be printed has no pattern. The pattern data may by-pass half-toning and possibly masking, as discussed earlier.

Figure 17:
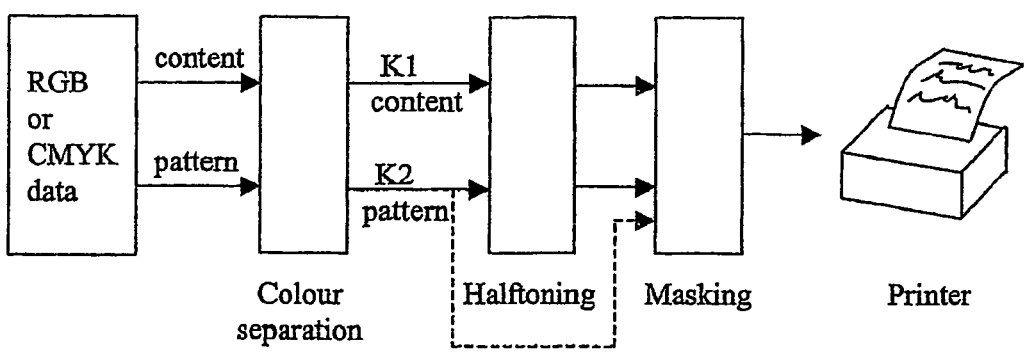

FIG. 17 illustrates that at some times the printer prints content using K2, and at other times it prints content using K1, depending upon whether there is pattern in the print job.

As discussed earlier, K2 can also be used for content that is not superposed with pattern that is to be read (either to create black content, or to include K2 in the inks used for the content). Different LUT's may be used for different regions of the same document.

In one variant, FIG. 17 represents a printer with no inks of other colours beyond K1 and K2 (e.g. a four-colour printer with K1, K2, and either two empty channels or two K1s and a K2, two K2s and K1, or two K2s and two K1s. In another variant, FIG. 17 represents a four-colour printer with inks CMYK2, K1 being produced by mixing CMY.

The invention allows a user to print out a document that has "Anoto-type functionality". That is, a document that has a machine readable location pattern and a human readable content that does not interfere with the functionality of the pattern. This is extremely convenient for the user since the user does not have to pre-order paper having the pre-printed pattern. The user is also able to design the document immediately prior to printing. The user may design both the human readable content and the pattern areas which are to be printed on the document, or they may call the document up from a library of documents, or they may call up part of a document and design/amend/add part of it. The invention allows the user to produce the document at a location that is convenient to the user for example at a local printer or a printer that is networked to his workstation. This allows the user quick access to the document so that the document can be reviewed and if appropriate put into use or dispatched for use. Alternatively, a user can design an electronic document and then send this document over the Internet (or via a local network) to another person. The other person may then review, alter or print out the document using a printer according to the present invention.

Many embodiments of the invention enable us to have a single digital printer than can print both "Anoto-enabled" documents at one moment in time, using inks from their ink set in a certain way, and also, at a different moment in time, "non-Anoto-enabled" documents using inks from their ink set in a different way. The same ink in the printer's ink set may be used in different ways depending upon whether the document has pattern or not, or whether different regions of the document have pattern or not. The use of different colour translation mechanisms to go from RGB to ink-based colour separation values/planes may enable the printer to switch between an "Anoto-enabled" printing mode, and a "normal" printing mode.

Dedicating a colour channel exclusively for pattern, at least when printing documents that have pattern, and using only that channel to print pattern, is advantageous in many embodiments. Realising that if a specific colour ink, say black ink, is not to be used when printing content (or that a different black ink with different printing properties is to be used instead of a first black ink) results in a need to have different amounts of the primary colours (typically CMY) in order to compensate for the variation, is also important in some multi-colour printing operations in order to achieve good colour faithfulness to what was intended. Using the same look-up data for different ink sets may give inferior results: we prefer to use, in some embodiments, more than one look-up table, and possibly a different look-up table for each permissible restricted set of inks from the full ink set provided in the printer. A different mix of colours, e.g. CMY, and K if permissible, may be used for the same colour when printing in different modes (Anoto-enabled or Anoto-disabled).

Some printers that we envisage will have an ink, e.g. a black ink, but will not actually use it for printing content even though they are printing that colour, at least when that content overlies pattern (or possibly for the whole document/page).

Figure 19:
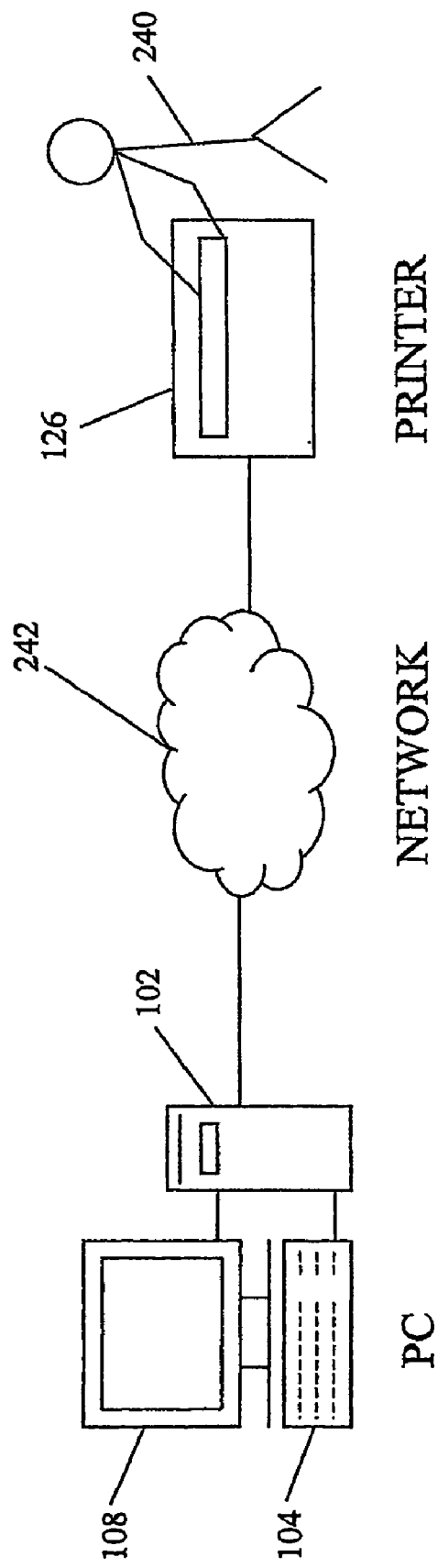
FIG. 19 schematically shows how in an embodiment a user can change the ink cartridges in a printer to allow the printer to print a machine readable pattern.

FIG. 19 shows schematically how an existing printer 126, for example HP DJ 10 PS, can be used both in its normal operation for printing content only using CYMKLcLm ink cartridges/pens and in a mode for printing Anoto-type documents using an infra-red absorbent ink for the ink pattern. Initially, the printer 126 contains its six default cartridges, CYMKLcLm, and a user 240 can initiate a content-only print job (no Anoto-type pattern) from his PC, PDA, mobile phone, digital camera or other suitable device.

When the user 240 desires to print a document containing an Anoto pattern in infra-red absorbing ink, he does two things. He physically removes at least one ink cartridge from the printer 126 and replaces it with an IR absorbing ink cartridge (K2) and then selects an alternative LUT to ensure that the printer 126 adjusts the colour separation according to the cartridges that are now present in the printer 126.

There are a number of options as to which of the default ink cartridges can be replaced:
  i) replace Lc with K2 and leave Lm in situo in the printer;
  ii) replace Lm with K2 and leave Lc in situo in the printer;
  iii) replace both Lc and Lm with K2;
  iv) replace Lc with K2 and remove Lm;
  v) replace Lm with K2 and remove Lc;
  vi) replace Lc with K2 and replace Lm with a spot colour;
  vii) replace Lm with K2 and replace with Lc with a spot colour; or
  viii) any other suitable replacement.

The option chosen can be based on a prediction of the documents that are likely to be printed. For example, if a lot of company brochures are to be printed it may be desirable to choose option (vi) or (vii) where the spot colour is the main colour of the company's logo.

Each option will have its own LUT associated with it. Once a user 240 has replaced the desired ink cartridges he then selects the correct LUT for the printer 126 to use (or it is selected automatically by the system). This can be done from the user's PC 102, for example when selecting the print command, possibly using a GUI. It will be appreciated that the LUT's could be stored on the PC 102, on any network 242 that the PC 102 is connected to, or on the printer 126 itself. In an alternative embodiment, the desired LUT can be selected via input means on the printer 126 itself, and can be selected manually or automatically when physically changing the cartridges.

Once the documents containing an Anoto pattern have been printed, it will be appreciated that the new "Anoto-friendly" ink cartridge(s) can be removed and replaced with the original cartridge for that slot(s), that is returning the ink cartridges to the default CYMKLcLm arrangement. The original LUT is then selected and printing of content-only documents can continue in the usual way.

The K of a conventional CMYK (or CYMKLcLm) printer may be infra-red-absorbing (i.e. be K2), and the user may, in the above scenario, be replacing Lc and/or Lm with K1 (infra-red-non-absorbing black ink).

It will be appreciated that we are able to provide good quality, reliable, print on demand of documents having both pattern and content using existing printer technology, and not only that, using existing models of digital printers. What many embodiments require is an appropriate choice of inks in their ink set (an ink that is absorbent in infra-red, for example, and an ink that is not), and an appropriate Look-Up Table to be used during colour separation, the LUT directing the use of no, or a deminimus amount of, ink which is infra-red absorbing for inclusion in colours that are used in content either (a) at all on a document, or (b) at least in areas on the document that also have pattern. A second LUT is often provided that does use infra-red absorbing ink in the inks used to print content when the document, or areas of the document, is not to be so susceptible to being read by a pen. The infra-red absorbing ink may have a higher optical density than the non-infra-red ink and for that reason may be preferred for use in circumstances where infra-red transparency is not necessary. In some examples, a user may physically change it, or an automatic change may be made, from a "normal" printing mode to an "Anoto-friendly" printing mode (e.g. in a hexichrome printer having CMYKLmLc, where K is infra-red absorbing anyway, they may (having perhaps first powered down the printer) remove Lm and/or Lc ink pens/reservoirs and install one, or two, K1 ink pens/reservoirs that contain black ink that is not significantly absorbent at an infra-red wavelength of interest. They then use the LUT that is "Anoto-friendly" in how it performs colour separation. To convert the printer back again, the user removes the K1 ink(s) and re-inserts the Lm, Lc inks and uses the conventional LUT to perform colour separation.

Thus, a user installs an additional LUT and swaps over ink pens to convert existing printers.

The above pre-supposes that conventional CMY inks are infra-red transparent. Many are. If the CMY inks in the existing printer were not infra-red transparent, they too would have to be swapped out of the printer and replaced with CMY inks that are infra-red transparent in order to provide "Anoto-friendly" printing.

Having existing printers having a special mode, with appropriate modification, means that millions of existing printers can be reconfigured to use the invention: it is retro-fittable to the existing printer population.

Thus, we have realised that existing commercial printers can print an Anoto position-determining pattern and document content efficiently, but they have to be pre-prepared in order to do so so that they, for example, have to print the content of the document using exclusively infra-red transparent inks, or so that they print content in areas of the document which are superposed with pattern, which pattern is intended to be read, with exclusively infra-red transparent inks.

Some embodiments of the invention achieve a special use mode of at least some models of printers in which the content of a document is printed using CMYK infra-red transparent inks, and the pattern is printed using exclusively an infra-red marker channel, both being printed simultaneously, by access to the printer's internal files that describe and control the ink usage. Also the proper printer firmware (internal software that controls all printer parts, printheads, etc.) has to be adapted to that special use mode. For many embodiments, the modifications consist in:

(i) adding a specific ink separation file (for example, but not necessarily, in the form of a LUT), that recreates the content colours using the CMYK inks, and allows the pattern to be generated in another, separate, channel;

(ii) modifying the ink pen (or printer ink reservoir) configuration, so that the printer can fire dots from the infra-red marker instead of the light magenta pen; and (iii) implementing the printer logic to reproduce the desired pattern.

We also envisage another special use mode of an existing printer in which we print only the pattern using the infra-red marker in a first pass, then, optionally, we remove the infra-red marker and reload the marked paper and we print the content of the document in a second pass, with infra-red transparent inks. This workflow could fit in a standard CMYK printer workflow. This is reliable if we can guarantee that the ink separation file used in the first pass (pattern) uses exclusively infra-red marker and that the ink separation file of the second pass (content) uses exclusively infra-red transparent inks. This requires access to the printer ink separation tables, and to load these tables.

It will be appreciated that one could use a narrow band of wavelengths of the visible spectrum to be dedicated to pattern and not used in content (at least when pattern using that wavelength(s) is present) instead of a non-visible (e.g. infra-red) wavelength. The detector in the pen would then have to be sensitive to the selected narrow band or pattern wavelength (or a filter provided to ensure that a sensor with a wider sensitivity only saw e.m. radiation with that narrow wavelength band). We also seek protection for that concept.

In the same way as discussed above, the "dedicated to pattern" wavelength, or colour, (not to be used in content that overlies pattern) can, in fact, be used in content if there is no pattern in that area of the document anyway. We could print different areas of the same sheet of paper using different ink sets/different colour separation LUTs.

Figure 20A:
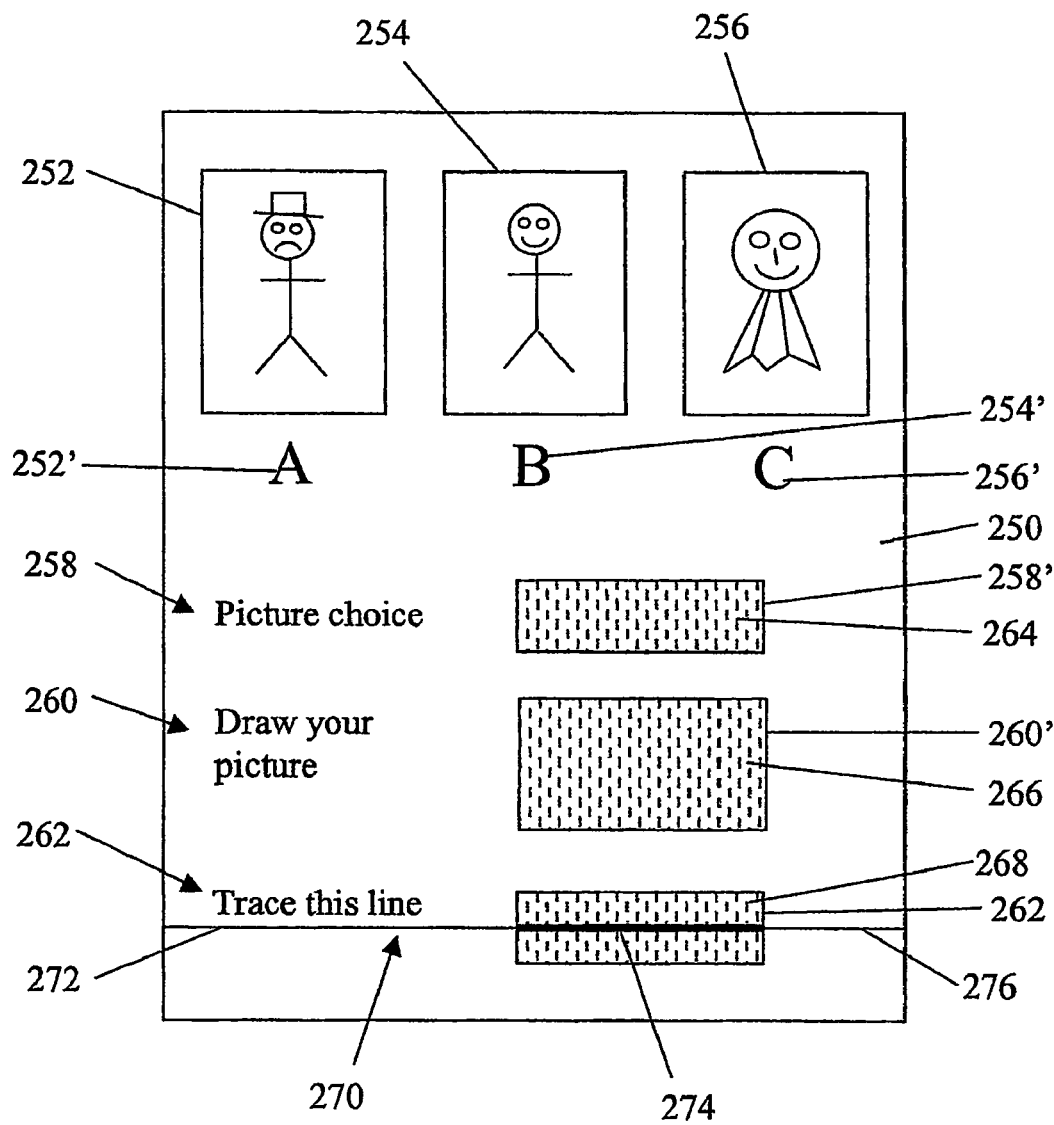
FIGS. 20a and 20b schematically show other embodiments of the invention.
Figure 20B:
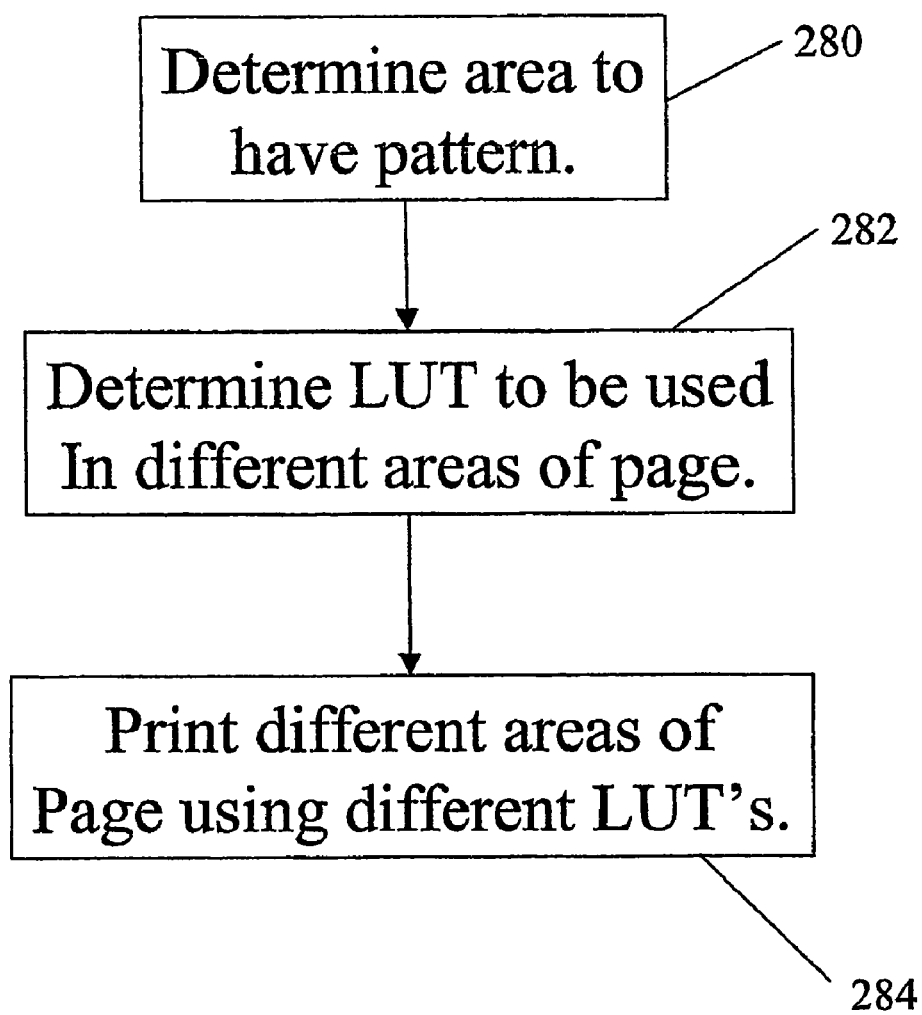

An embodiment of this concept will be expanded upon with reference to FIGS. 20a and 20b. FIG. 20a shows an educational aid page of paper 250 having photographs or pictures 252, 254, 256 printed on it, legends 252', 254' and 256' (A, B and C in the drawing) identifying each picture, three questions or instructive legends 258, 260, 262 printed on it, and three areas of Anoto-type position-determining pattern 264, 266, 268 associated with the instructions 258, 260 and 262 respectively. Also printed on the page 250 is a line 270 having three portions: portion 272 to the left of pattern 268, portion 274 superposed with pattern 268, and portion 276 to the right of pattern 268. A user, e.g. a child, is asked to choose their favourite picture out of pictures 252 to 256 and write the corresponding letter in box 258', which contains pattern 264. The user is then asked to copy their favourite picture and draw it in box 260' which contains pattern 266. The user is then asked to trace line 272 across the page. The user does these acts using a digital pen, such as the Logitec IO™. When the user writes on the pattern areas 264, 266, 268 the writing is captured digitally by the pen and sent off-pen to a processor (not shown). The user's attempts to fill in the form/answer the questions can then be assessed by software and/or a remote person. Thus the form can be used to encourage children to write letters (e.g. "A", "B" or "C"), capture their writing so a remote user can see the letter formation, and can be used to encourage drawing skills/pen control skills. Tracing line 270 can be used to assess the user's pen control skills.

The form/page 250 has been printed by a digital printer (e.g. a laser or inkjet printer) having two different black inks, K1 which does not absorb infra-red radiation much, and K2 which is strongly infra-red absorbing.

Photographs 252 to 256, legends 252' to 256' and questions/instructions 258 to 262 are all printed in K2—infra-red absorbing black ink. The printed photographs 252 to 256 may also have other colour inks in them. Pattern 264 to 268 is printed in K2—infra-red absorbing ink. Portions 272 and 276 of line 270 are printed in K2. Portion 274 of line 270, which is superposed upon the pattern 268, is printed in K1—black ink which does not absorb the infra-red wavelength. This means that when a user traces the line portion 274, the digital pen can still see the dot pattern 268, without line portion 274 interfering with that ability.

In one embodiment K1 is a separate ink, and in another embodiment K1 is not a separate ink as such, but is made by mixing other ink colours (e.g. CMY). Thus an ink cartridge containing CMYK, where K is K2, can be used to print the page 250.

FIG. 20b schematically shows a process implemented by a control processor controlling print operations of a digital printer, such as a laser printer or inkjet printer, for example. The processor may be in the printer, or in a computer controlling the printer/sending instructions to the printer, or in a communication link with a printer.

An area of a document, e.g. a sheet of paper, to be printed by the printer is determined to be printed with position-determining pattern, at step 280. A determination is made as to which of a plurality of Look Up Tables (LUTs)—or other colour separation files or datasets—is to be used for matter (e.g. content) to be printed in said patterned area at step 282. Also, a determination of which LUT, or other colour separation file or dataset, is to be used for other areas of the document is made at step 282. The printer is then controlled at step 284 to print the document using different LUTs for different areas of the page.

For example, in relation to FIG. 20b as applied to printing the document of FIG. 20a, a first LUT using CMYK2 is used to print matter in all of the areas of the page except in the patterned areas 258', 260' and 262'. A second, different LUT is used to print in the areas 258', 260' and 262'. This second LUT uses CMYK2, and pattern is separated into a K2 channel, and content overlying pattern (e.g. the portion 274 of line 270) is, according to the second LUT, printed using CMY only, no K2. In this example the printer has CMYK2 as inks.

In another example the printer has CMYK1K2 as inks, where K1 is a black ink that is not infra-red absorbing, and the second LUT causes the content superposed in patterned areas to be printed with K1, and not K2. In this example the document has two different black inks used for content, depending upon whether the content is superposed with pattern or not.

Content can be printed before or after pattern, or at the same time, so long as when the content is printed it is known whether it is superposed on an area which contains, or is to contain, pattern, and therefore it is known which LUT to use for that area of the document, and hence whether to use K2 or not.

It is not intended to exclude embodiments which print some part of the patterned areas with K2, thereby obscuring some parts of the patterned areas from being able to have their pattern read, if those parts of the patterned areas are at immaterial locations in the pattern where it does not matter whether or not the pen can read the pattern. For example, frame lines for boxes 258', 260' and 262' may be printed in K2, and may overlie pattern, but the form still works and it does not matter.

Thus in some embodiments the pattern area definitions (at least the physical areas on the page that pattern areas occupy) are sent to the printer along with the content, possibly first before the content, so that when the printer is printing content it is already known whether that content will overlie or underlie pattern so that the inks used to print the content can be selected accordingly. The identification of an area of the page as "pattern to be read bearing" would define that area for special colour handling during the print operation, and special rendering for graphical content objects applied to that area. If a graphical object (e.g. text, line, image, etc.) is sent to a "pattern free area" then it will have standard colour management applied and rendered as normal (CMYK). If a graphical object is inside (or overlaps) a pattern area, then special colour management and rendering should be applied (in this embodiment). The object will be rendered into CMY (no K).

This has the advantage that the application sending the object for printing does not need to know anything about the pattern; it just sends objects as normal. Objects that overlie pattern (are superposed with pattern) are printed with ink that does not interfere with a digital pen reading the pattern. An object that is part over and part outside a patterned area may be printed entirely with non-IR absorbing ink, or part of the graphical object may be printed with one ink, and part with another ink. Objects may be rendered in their best form possible consistent with where they are on the page (best colours, accuracy, quality, etc.).

The invention claimed is:

1. A print control system configured to control a single digital printer having a first machine-readable ink and a second ink that is not machine-readable at the same wavelength as said first ink, said system being configured to cause said printer to print documents having both (i) machine-readable pattern printed in the first ink, wherein the pattern is configured to enable a digital pen to acquire data to enable its position in said pattern to be determined, and (ii) human-discernable content, printed in the second ink, that is not read by said pen in use, said system being configured to route data representative of content colour to (i) a colour separation process, and to (ii) a half-toning process, and to (iii) a masking process, and where said system is configured to route data representation of pattern so as to by-pass a half-toning process.

2. A control system according to claim 1 configured to route data representative of pattern so as to by-pass a masking process.

3. A control system according to claim 1 configured to route data representative of content through a linearisation process, and configured to route data representation of pattern so as to by-pass said linearisation process.

4. A control system according to claim 1 configured to route data representative of pattern so as to by-pass a masking process and configured to route data representative of content through a linearisation process, and configured to route data representation of pattern so as to by-pass said linearisation process.

5. A method of printing a document:
comprising:
digitally printing a human-discernable content and a machine-readable position-determining pattern, configured to enable a digital pen to determine the pen's position in a pattern space onto the document using a single digital printer, wherein the digital printer includes a first ink which is not machine-readable at a particular wavelength of electromagnetic radiation and a second ink that is machine-readable at the said particular wavelength; and
printing the content with the first ink and not the second ink, at least where said content overlies said pattern; and
printing the pattern using the second ink;
wherein data representative of content is half-toned, and wherein data representation of pattern bypasses a half-toning process.

6. A method according to claim 5 wherein data representative of content is operated upon by a masking process, and data representation of pattern bypasses a masking process.

7. A method of printing on demand a page or other article, the method comprising:
printing, using a single digital printer, a machine-readable position-determining pattern with a first ink, wherein the pattern is configured to enable a digital pen to determine the pen's position in a pattern space, and wherein the pattern is readable at a specific, optionally non-visible, wavelength;
printing, using the single digital printer, human-discernable content in a second ink; and
processing the content data differently from the pattern data during data processing performed to print the document.

8. A method of printing according to claim 7 further comprising treating the pattern as text content in a printer driver, and printing the pattern using exclusively one ink that is readable by a machine at said non-visible wavelength, or exclusively using a plurality of inks that are readable at said non-visible wavelength, and printing the content, at least that content which is superposed with said pattern, using exclusively an ink that is not machine-readable at said non-visible wavelength.

9. A method of printing according to claim 7, the method comprising taking an RGB version of an image from a computer and isolating the pattern in its own colour plane, optionally during a colour separation process, content being printed with other available colour planes not including said pattern colour plane.

10. A method according to claim 9 in which content colour plane data undergoes a half-toning and masking operation in order to determine what content, if any, is printed at each pixel of the printing operation, and wherein pattern colour plane data bypasses the half-toning operation.

* * * * *